US011249248B2

(12) United States Patent
Kashyap et al.

(10) Patent No.: US 11,249,248 B2
(45) Date of Patent: Feb. 15, 2022

(54) METHOD AND SYSTEM FOR FABRICATING AN OPTICAL FIBER DEVICE FOR SHAPE SENSING

(71) Applicant: POLYVALOR, LIMITED PARTNERSHIP, Montréal (CA)

(72) Inventors: Raman Kashyap, Baie d'Urfe (CA); Sébastien Loranger, Montreal (CA); Frédéric Monet, Montréal (CA); Samuel Kadoury, Mount Royal (CA); Pierre Lorre, Montreal (CA)

(73) Assignee: POLYVALOR, LIMITED PARTNERSHIP, Québec (CA)

( * ) Notice: Subject to any disclaimer, the term of this patent is extended or adjusted under 35 U.S.C. 154(b) by 29 days.

(21) Appl. No.: 16/666,719

(22) Filed: Oct. 29, 2019

(65) Prior Publication Data
US 2020/0132926 A1  Apr. 30, 2020

Related U.S. Application Data

(60) Provisional application No. 62/751,951, filed on Oct. 29, 2018.

(51) Int. Cl.
  *G02B 6/02*  (2006.01)
  *G02B 6/42*  (2006.01)
  *G02B 6/44*  (2006.01)

(52) U.S. Cl.
  CPC ....... *G02B 6/02347* (2013.01); *G02B 6/0208* (2013.01); *G02B 6/4266* (2013.01); *G02B 6/4471* (2013.01)

(58) Field of Classification Search
  CPC .............. G02B 6/02347; G02B 6/4266; G02B 6/4471; G02B 6/4405; G02B 6/0229; G02B 6/0208; G02B 6/06; G02B 6/4415; G02B 6/02142
  See application file for complete search history.

(56) References Cited

U.S. PATENT DOCUMENTS

| 7,781,724 B2* | 8/2010 | Childers | G01D 5/35303 250/227.14 |
| 8,187,481 B1* | 5/2012 | Hobbs | G02B 1/118 216/24 |
| 9,395,304 B2* | 7/2016 | Yang | B82Y 40/00 |
| 9,417,057 B2* | 8/2016 | 'T Hooft et al. | G01B 11/16 |

(Continued)

OTHER PUBLICATIONS

Yan, Aidong, et al. "Distributed Optical Fiber Sensors with Ultrafast Laser Enhanced Rayleigh Backscattering Profiles for Real-Time Monitoring of Solid Oxide Fuel Cell Operations" Scientific reports 7.1 (2017): 9360.

*Primary Examiner* — Ryan A Lepisto
*Assistant Examiner* — Erin D. Chiem
(74) *Attorney, Agent, or Firm* — Norton Rose Fulbright Canada LLP

(57) ABSTRACT

There is described a method of fabricating an optical fiber device, the method comprising: positioning longitudinal portions of a plurality of optical fibers alongside each other in a given geometrical relationship, depositing liquid coating material around the longitudinal portions of the plurality of optical fibers; and the liquid coating material setting up around the longitudinal portions of the plurality of optical fibers thereby maintaining said given geometrical relationship along the longitudinal portions.

8 Claims, 30 Drawing Sheets

(56) References Cited

U.S. PATENT DOCUMENTS

| | | | |
|---|---|---|---|
| 9,958,605 B2* | 5/2018 | Wei .................... | G01B 11/2441 |
| 2008/0212082 A1* | 9/2008 | Froggatt ............ | G01D 5/35316 |
| | | | 356/73.1 |
| 2017/0153387 A1* | 6/2017 | Wei .................... | G01B 11/2441 |

* cited by examiner

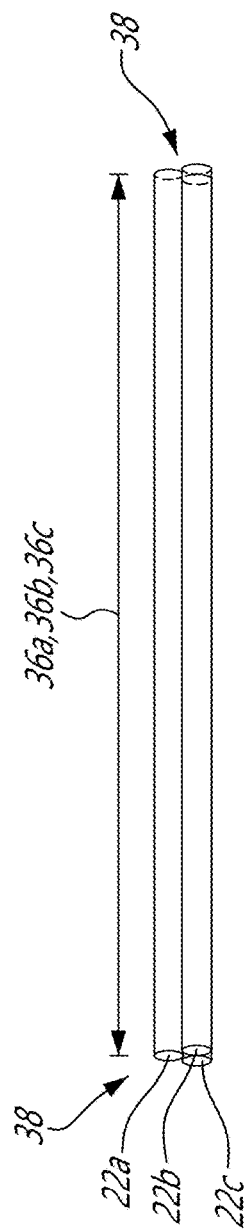
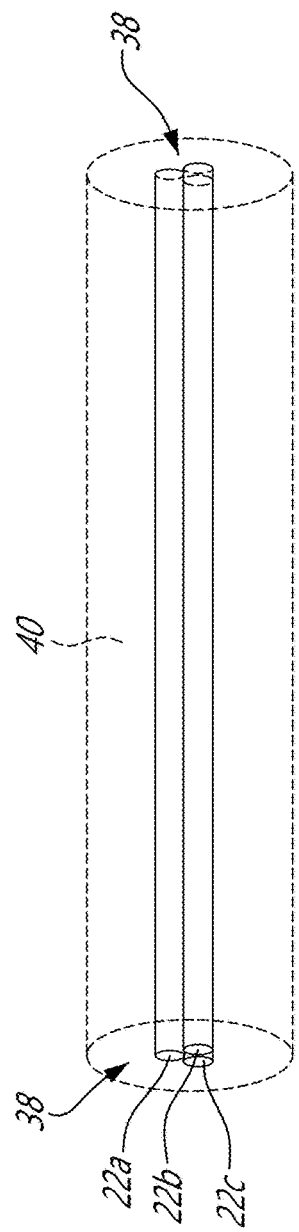
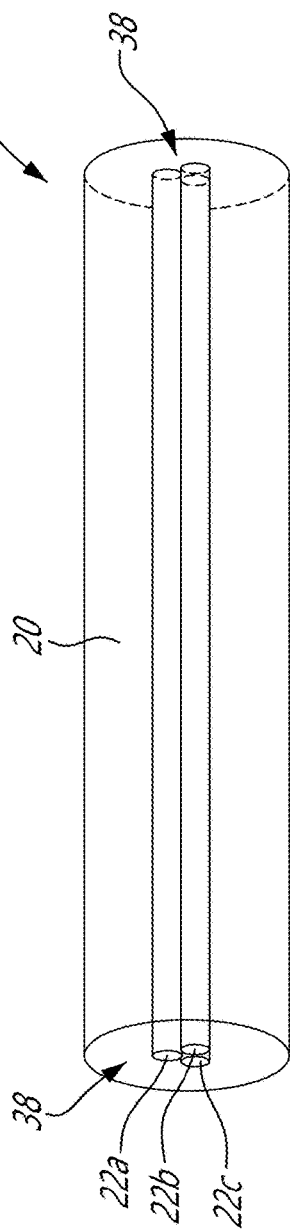

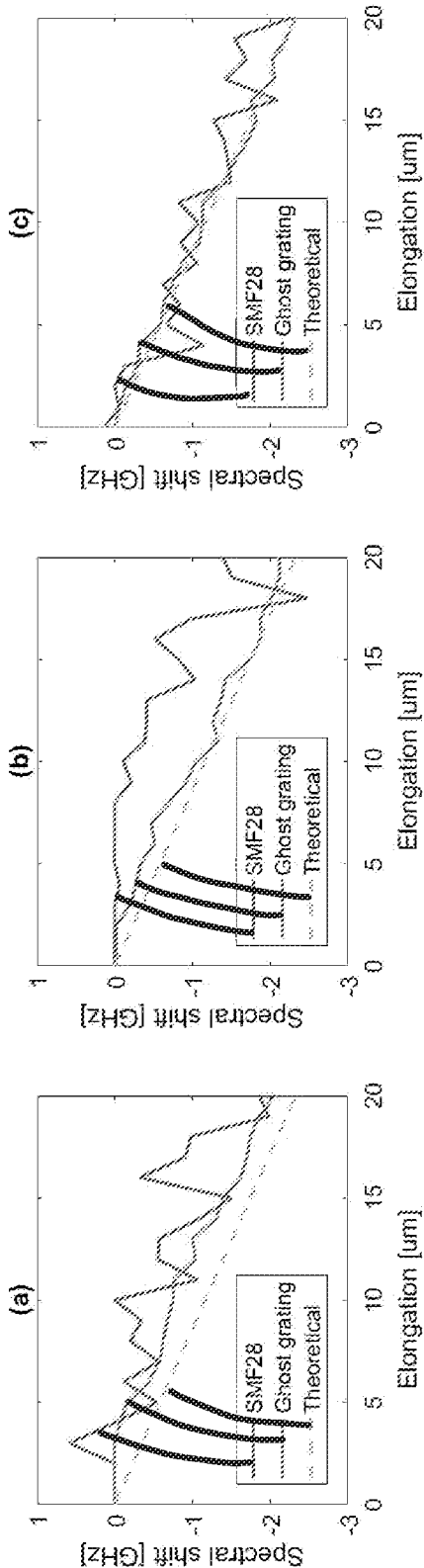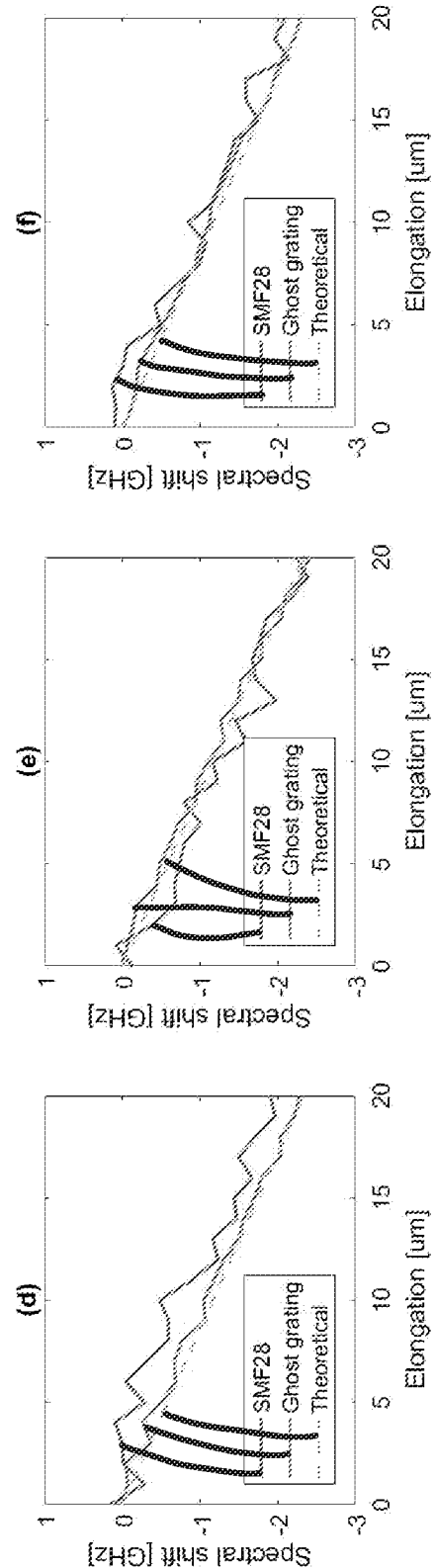
Fig. 26A  Fig. 26B  Fig. 26C
Fig. 26D  Fig. 26E  Fig. 26F

METHOD AND SYSTEM FOR FABRICATING AN OPTICAL FIBER DEVICE FOR SHAPE SENSING

CROSS-REFERENCE TO RELATED APPLICATIONS

The present application claims priority on U.S. Patent Application No. 62/751,951 filed Oct. 29, 2018, the entire contents of which are incorporated herein by reference.

FIELD

The improvements generally relate to fabrication of optical fiber devices, and more particularly relate to fabrication of optical fiber devices for two- or three-dimensional shape sensing purposes.

BACKGROUND

Two- or three-dimensional shape sensors generally involve an optical fiber device having two or more optical fibers extending alongside each other in a given geometrical relationship, an interrogator optically coupled to the optical fibers, and a computing device communicatively coupled to the interrogator. As the optical fiber device experiences a curvature-induced strain along its length, a relative longitudinal tension or compression with respect to the center of the optical fiber device will cause the optical fibers to register positive- or negative-induced strain changes, respectively. To calculate a local curvature, the relative strains are measured in real-time by the interrogator and the measured strains are processed by the computing device according to known algorithms. Although optical fiber devices for shape sensing applications are satisfactory to a certain degree, there remains room for improvement, especially in providing fabrication methods and systems which can limit variations in the positioning of the optical fibers with respect to one another along the length of the optical fiber device.

SUMMARY

In accordance with a first aspect of the present disclosure, there is provided a method of fabricating an optical fiber device, the method comprising: positioning longitudinal portions of a plurality of optical fibers alongside each other in a given geometrical relationship, depositing liquid coating material around the longitudinal portions of the plurality of optical fibers; and the liquid coating material setting up around the longitudinal portions of the plurality of optical fibers thereby maintaining said given geometrical relationship along the longitudinal portions.

Further in accordance with the first aspect of the present disclosure, said depositing can for example include extruding the liquid coating material around the longitudinal portions of the plurality of optical fibers while maintaining said given geometrical relationship.

Still further in accordance with the first aspect of the present disclosure, said extruding can for example include forcing the liquid coating material at a longitudinal position around the longitudinal portions of the plurality of optical fibers and moving the longitudinal portions of the plurality of optical fibers longitudinally during said forcing.

Still further in accordance with the first aspect of the present disclosure, said moving can for example include longitudinally pulling on ends of the plurality of optical fibers.

Still further in accordance with the first aspect of the present disclosure, said moving can for example be performed as the longitudinal portions of the plurality of optical fibers are longitudinally received in an opening having an inner surface confining the plurality of optical fibers into the given geometrical relationship.

Still further in accordance with the first aspect of the present disclosure, said depositing can for example include maintaining the plurality of optical fibers parallel to one another.

Still further in accordance with the first aspect of the present disclosure, said depositing can for example include melting coating material thereby forming the liquid coating material, and wherein said setting up includes cooling the liquid coating material.

Still further in accordance with the first aspect of the present disclosure, the method can for example comprise, prior to said depositing, heating a plurality of optical fiber preforms, and drawing the plurality of optical fiber preform into the plurality of optical fibers.

Still further in accordance with the first aspect of the present disclosure, the method can for example comprise, after said drawing, inscribing one or more optical gratings along a portion of each of the plurality of optical fibers.

Still further in accordance with the first aspect of the present disclosure, at least one of the optical gratings can for example have a random continuous distribution such that a return signal propagating in said optical fiber has a full width at half maximum bandwidth ranging between about 0.1 THz and about 40 THz.

In accordance with a second aspect of the present disclosure, there is provided a system for fabricating an optical fiber device, the system comprising: a coating material source having liquid coating material; a die having a longitudinal conduit receiving a plurality of optical fibers extending alongside each other; an optical fiber positioner confining longitudinal portions of the plurality of optical fibers in a given geometrical relationship relative to one another; and a coating device in fluid communication with the coating material source and with the longitudinal conduit of the die, the coating device flowing the liquid coating material around at least the longitudinal portions of the plurality of optical fibers when received in the longitudinal conduit and positioned in the given geometrical relationship, the coating material setting up around the longitudinal portions of the plurality of optical fibers thereby maintaining said given geometrical relationship along the longitudinal portions.

Further in accordance with the second aspect of the present disclosure, the optical fiber positioner can for example be within the longitudinal conduit of the die.

Still further in accordance with the second aspect of the present disclosure, the optical fiber positioner can for example include a nozzle an opening with an inner surface of a given shape, the inner surface confining the longitudinal portions of the plurality of optical fibers in the given geometrical relationship, and an outer surface upon which the liquid coating material flows.

Still further in accordance with the second aspect of the present disclosure, the inner surface of the opening of the nozzle can for example have a dimension below 1 mm, preferably below 500 µm and more preferably below 400 µm.

Still further in accordance with the second aspect of the present disclosure, the system can for example comprise a pulling mechanism pulling on ends of the plurality of optical fibers in a longitudinal orientation as the liquid coating material is flowed around the plurality of optical fibers.

Still further in accordance with the second aspect of the present disclosure, the system can for example comprise an inscription device upstream from said flow mechanism, the inscription device inscribing one or more optical gratings along a portion of each of the plurality of optical fibers.

Still further in accordance with the second aspect of the present disclosure, the system can for example have a heater melting solid coating material to obtain the liquid coating material. The heater may be part of the coating material source.

Still further in accordance with the second aspect of the present disclosure, the system can for example have a cooler for cooling the melted liquid coating material after deposition. The cooler may be part of the coating material source or be a standalone component in thermal communication with at least a portion of the die.

Still further in accordance with the second aspect of the present disclosure, the cooler can be at least one of a fluid flow cooler such as a forced air flow cooler, a water-based cooler and the like, and/or a thermoelectric unit such as a Peltier module.

Still further in accordance with the second aspect of the present disclosure, said positioning can for example include positioning at least an additional component relative to the plurality of optical fibers, said depositing including depositing liquid coating material also around said additional component; the liquid coating material setting up around the additional component as well. The additional component can be one or more of any one of the following group of components: an electrical wire, a conductive glass fiber, a capillary fiber, a photonic crystal fiber, a laser delivery fiber and any other suitable component.

In accordance with a third aspect of the present disclosure, there is provided an optical fiber device having a plurality of optical fibers each having a respective longitudinal portion extending alongside each other in a given geometrical relationship, a coating layer around the longitudinal portions of the plurality of optical fibers, the coating layer maintaining the plurality of optical fibers in the given geometrical relationship along the longitudinal portions of the plurality of optical fibers.

Further in accordance with the third aspect of the present disclosure, the given geometrical relationship can for example be a triangle.

Still further in accordance with the third aspect of the present disclosure, the triangle can for example be an isosceles triangle.

Still further in accordance with the third aspect of the present disclosure, the triangle can for example be an equilateral triangle, with the longitudinal portions of the plurality of optical fibers being adjoining to one another.

Still further in accordance with the third aspect of the present disclosure, the optical fiber device can for example comprise one or more optical gratings along said longitudinal portions of each of the plurality of optical fibers.

Still further in accordance with the third aspect of the present disclosure, at least one of the optical gratings can for example have a random continuous distribution such that a return signal propagating in said optical fiber has a full width at half maximum bandwidth ranging between about 0.1 THz and about 40 THz.

Still further in accordance with the third aspect of the present disclosure, the optical fiber device can for example include at least an additional component relative to the plurality of optical fibers inside said coating layer. The additional component can be one or more of any one of the following group of components: an electrical wire, a conductive glass fiber, a capillary fiber, a photonic crystal fiber, a laser delivery fiber and any other suitable component.

In accordance with a fourth embodiment of the present disclosure, there is provided a distributed temperature and strain sensing (DTSS) system comprising: an optical interrogator; an optical coupler assembly having an input being optically coupled to the optical interrogator and a plurality of outputs; and a plurality of optical fiber devices having at least: a first optical fiber device having a first sensing optical fiber being serially connected to a first one of the plurality of outputs of the optical coupler assembly; and a second optical fiber device having an optical path extender being serially connected to a second one of the plurality of outputs of the optical coupler assembly, the optical path extender having an optical path length being equal to or greater than an optical path length of the first optical fiber device, and a second sensing optical fiber being serially connected to the optical path extender; wherein, during use, the optical interrogator is configured for emitting an optical signal at the input of the optical coupler assembly, and for receiving, in response to said emitting, a first return optical signal returning from the first sensing optical fiber and a second return optical signal returning from the second sensing optical fiber, the first and second return optical signal being temporally delayed from one another due to the difference in their corresponding optical path lengths.

Further in accordance with the fourth embodiment of the present disclosure, the DTSS system can comprise for example a third optical fiber device having an optical path extender being serially connected to a third one of the plurality of outputs of the optical coupler assembly, the optical path extender of the third optical fiber device having an optical path length being equal to or greater than an optical path length of the second optical fiber device, and a third sensing optical fiber being serially connected to the optical path extender of the third optical fiber device; wherein, during use, the optical interrogator is configured for receiving a third return signal returning from the third sensing fiber, the first, second and third return signal being temporally delayed from one another.

Still further in accordance with the fourth embodiment of the present disclosure, the DTSS system can for example comprise a fourth optical fiber device having an optical path extender being serially connected to a fourth one of the plurality of outputs of the optical coupler assembly, the optical path extender of the fourth optical fiber device having an optical path length being equal to or greater than an optical path length of the third optical fiber device, and a fourth sensing optical fiber being serially connected to the optical path extender of the fourth optical fiber device; wherein, during use, the optical interrogator is configured for receiving a fourth return signal returning from the fourth sensing fiber, the first, second, third and fourth return signal being temporally delayed from one another.

Still further in accordance with the fourth embodiment of the present disclosure, at least one of the first and second sensing optical fibers can for example have a scatter increasing device being configured for increasing scattering of the corresponding optical signal as it propagates along the at least one of the first and second sensing optical fibers.

Still further in accordance with the fourth embodiment of the present disclosure, the scatter increasing device can for example be an optical grating inscribed along a portion of a corresponding one of the first and second sensing optical fibers, the optical grating having a random continuous distribution such that a return signal, caused by propagation of an optical signal therealong, has a full width at half maximum bandwidth ranging between about 0.1 THz and about 40 THz.

Still further in accordance with the fourth embodiment of the present disclosure, said full width at half maximum bandwidth can for example range between about 0.35 THz and about 7 THz.

Still further in accordance with the fourth embodiment of the present disclosure, the grating can for example have a coherence length ranging between about 2λ and about 500λ when the return signal has a scattering spectrum with a Gaussian shape, wherein λ denotes a wavelength of the optical signal.

Still further in accordance with the fourth embodiment of the present disclosure, the coherence length can for example range between about 10λ and about 100λ.

Still further in accordance with the fourth embodiment of the present disclosure, the optical coupler assembly can for example be a one-by-two fiber coupler.

Still further in accordance with the fourth embodiment of the present disclosure, the optical coupler assembly can for example have one or more a X-by-Y fiber couplers, X and Y being positive integers.

Still further in accordance with the fourth embodiment of the present disclosure, the optical coupler assembly can for example have a plurality of two-by-two fiber couplers being connected to one another.

In accordance with a fifth aspect of the present disclosure, there is provided an optical device comprising: a length of optical fiber configured for propagating an optical signal; and an optical grating inscribed along a portion of the length of optical fiber, the optical grating having a random continuous distribution such that a return signal caused by said propagating has a full width at half maximum bandwidth ranging between about 0.1 THz and about 40 THz.

Further in accordance with the fifth aspect of the present disclosure, said full width at half maximum bandwidth can for example range between about 0.35 THz and about 7 THz.

Still further in accordance with the fifth aspect of the present disclosure, the grating can for example have a coherence length ranging between about 2λ and about 500λ when the return signal has a scattering spectrum with a Gaussian shape, wherein λ denotes a wavelength of the optical signal.

Still further in accordance with the fifth aspect of the present disclosure, the coherence length can for example range between about 10λ and about 100λ.

Still further in accordance with the fifth aspect of the present disclosure, the random continuous distribution can for example be a random phase distribution.

Still further in accordance with the fifth aspect of the present disclosure, the random continuous distribution can for example be a random period distribution.

Still further in accordance with the fifth aspect of the present disclosure, the random continuous distribution can for example be a random amplitude distribution.

Still further in accordance with the fifth aspect of the present disclosure, the random continuous distribution can for example be one or more from the group consisting of: a random phase distribution, a random period distribution and a random amplitude distribution.

Still further in accordance with the fifth aspect of the present disclosure, the optical grating can for example have a length being at least in the centimeter range.

Many further features and combinations thereof concerning the present improvements will appear to those skilled in the art following a reading of the instant disclosure.

DESCRIPTION OF THE FIGURES

In the figures,

FIG. 1A is a graph representing a three-dimensional model of the optical fiber device of FIG. 1, in accordance with one or more embodiments;

FIG. 4A is an oblique view of three optical fibers extending alongside each other in a given geometrical relationship, in accordance with one or more embodiments;

FIG. 4B is an oblique view of the three optical fibers of FIG. 4A having liquid coating material around longitudinal portions of the three optical fibers, in accordance with one or more embodiments;

FIG. 4C is an oblique view of an optical fiber device having the three optical fibers of FIG. 4A, and a coating layer being formed as the liquid coating material of FIG. 4B sets up, in accordance with one or more embodiments;

FIGS. 26A-F include graphs showing accuracy of both unexposed SMF-28 fiber and FBG inscribed using the system of FIG. 21, as the 115 cm fiber is being stretched from 0 to 20 µm, in 1 µm increments, for all scanning bandwidths provided by the OBR, namely (a) 1.31 nm, (b) 2.61 nm, (c) 5.24 nm, (d) 10.51 nm, (e) 21.16 nm, and (f) 42.90 nm;

DETAILED DESCRIPTION

Figure 1:
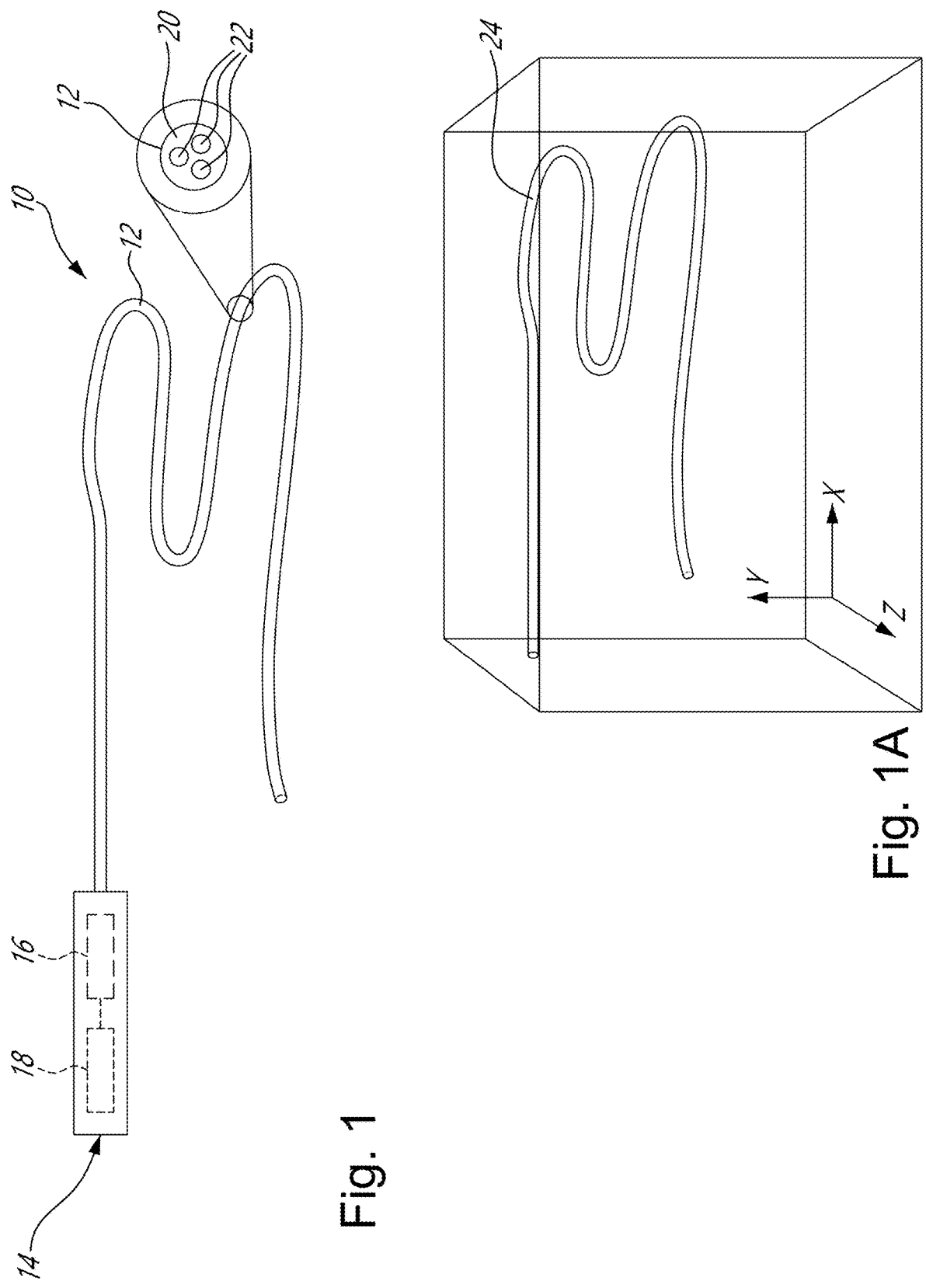
FIG. 1 is a schematic view of an example of a shape sensing device having an optical fiber device, in accordance with one or more embodiments.

FIG. 1 shows an example of a shape sensing system 10, in accordance with an embodiment. As depicted, the shape sensing system 10 has an optical fiber device 12, and an electro-optic module 14. The electro-optic module in this example has an optical interrogator 16 optically coupled to the optical fiber device 12 and a computing device 18 communicatively coupled to the optical interrogator 16. The computing device 18 is shown as a part within the electro-optic module 14 in this example, but could also be remote therefrom.

As shown, the optical fiber device 12 has a body 20 and two, three or more optical fibers 22 extending alongside each other within the body 20 in a given geometrical relationship relative to one another. As shown, when so-positioned, the optical fibers 22 are radially spaced-apart from a center of the body 20 of the optical fiber device 12. More specifically, in this example, the optical fibers 22 are circumferentially distributed around the center of the body 20 of the optical fiber device 12.

In this embodiment, the optical interrogator 16 is configured for transmitting optical signals along the optical fiber device 12 and for receiving return optical signals from the optical fiber device 12. Further, the optical interrogator 16 is configured to transmit electric signals to the computing device 18, the electric signals being representative of the received return optical signals. Based on the received electric signals, the computing device 18 is adapted and configured to generate a two- or three-dimensional model representing the shape and orientation of the optical fiber device 12 at a specific moment in time. For instance, FIG. 1A shows a plot of a model 24 in a given coordinate system (x, y, z) generated by the computing device 18, which represents the shape and orientation of the optical fiber device 12 shown in FIG. 1.

Accordingly, by monitoring the model of the optical fiber device 12 over time, the shape sensing system 10 allows the monitoring of the shape and the orientation of the optical fiber device 12 in real time or quasi real time. In some embodiments, the shape sensing system 10 generally has a small footprint and is lightweight, which can provide the ability to track instruments, bones and/or limbs, with a millimeter-level accuracy in some embodiments. In this embodiment, the shape sensing system 10 has one optical fiber device, having for example a diameter of 600 microns and a longitudinal length up to a few meters, at least 50 m or more. Alternately or additionally, the shape sensing system 10 can have more than one optical fiber device, with different diameters and/or different longitudinal lengths.

Figure 2:
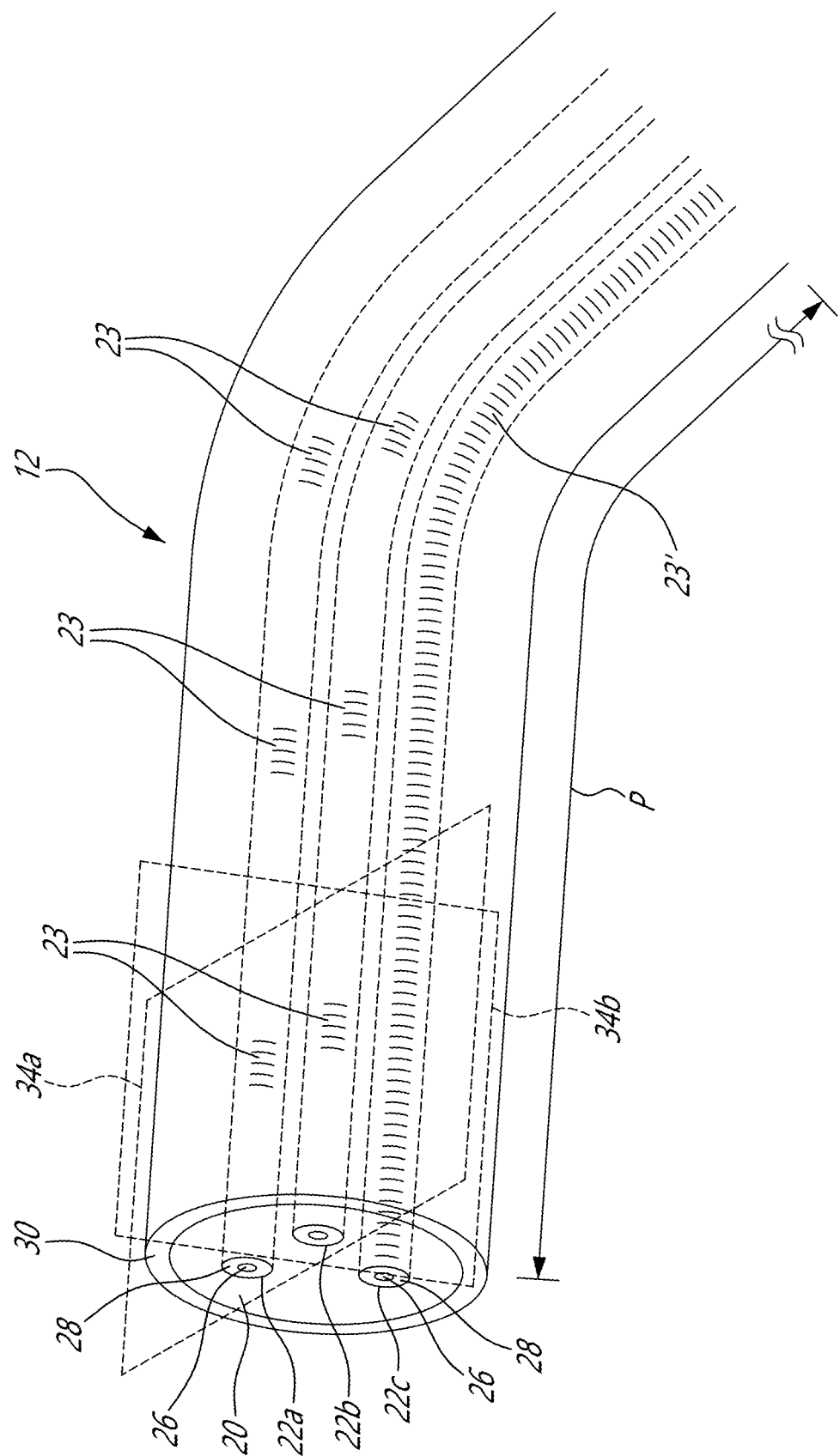
FIG. 2 is an enlarged view of a portion of the optical fiber device of FIG. 1, in accordance with one or more embodiments.

FIG. 2 shows a portion of the optical fiber device 12 of FIG. 1. As depicted, the optical fiber device 12 has three optical fibers 22a, 22b and 22c which extend along a longitudinal length l of the optical fiber device 12. In some other embodiments, the optical fiber device 12 can have two optical fibers for two-dimensional shape sensing, or a triplet of optical fibers (i.e. three optical fibers), four or more optical fibers for three-dimensional shape sensing.

In this example, the optical fibers 22a, 22b and 22c are embedded in the body 20. As will be described below, the body 20 is made of a coating material. Example of such coating material can include, but not limited to, M6823MZ from Total and any other suitable coating material. Preferably, the coating material can be melted to a liquid form during the fabrication process, after which it can sets up to a given shape around the optical fibers 22a, 22b and 22c and maintain that shape over time. As shown in this example, each of the optical fibers 22a, 22b and 22c has a respective core 26 surrounded by one or more inner claddings 28. The inner claddings 28 generally have a refractive index which is lower than a refractive index of the cores 26 to allow optical propagation therein. The refractive index of the cores 26 and/or inner claddings 28 need not to be identical from one optical fiber to another. As shown in this example, the optical fiber device 12 can have a sheath 30 covering the body 20 of the optical fiber device 12, for providing at least some mechanical resistance and/or thermal insulation.

As depicted, the optical fibers 22a, 22b and 22c are off-axis and circumferentially spaced-apart from one another within the body 20. In this example, the optical fibers 22a, 22b and 22c are circumferentially spaced-apart by 60° and therefore are positioned in an equilateral triangle shape. In this specific example, the optical fibers 22a, 22b and 22c are sized and shaped to be single-mode for light having a wavelength of 1550 nm. In alternate embodiments, however, each optical fiber may be sized and shaped to be multimode.

The shape sensing system 10 involves distributed strain measurements in each of the optical fibers 22a, 22b and 22c of the optical fiber device 12, at different longitudinal positions li along its longitudinal length l, to construct the model 24 discussed with reference to FIG. 1A. In this example, i is an integer ranging from 1 and a number N of longitudinal positions. The longitudinal increment Δl between two successive longitudinal positions li can be in the order of the millimeter for example. The longitudinal increments Δl between successive longitudinal positions li need not be identical for each pair of successive longitudinal positions li where strain measurements are taken.

In the context of the optical fiber device 12, bending of the optical fiber device 12 induces strain on each one of the optical fibers 22a, 22b and 22c, which can be measured by propagating light into each of the cores 26 during the bending and by monitoring reflected wavelengths resulting from said propagation. The induced strains are a function of the local degree of bending of the optical fiber device 12. For instance, more strain is induced in the optical fiber device 12 around its elbow portion than in any of its straight portions. To measure strain in a single optical fiber 22, light is sent down the core 26 which causes light to be reflected at different longitudinal positions along the core 26. Wavelengths of the reflected light are a function of the strain on the core 26 and of its temperature. The amount of reflected light can be enhanced by inscribing one or more fiber Bragg gratings (FBGs) 23 along the cores 26 of the optical fibers, as illustrated. As shown in this example, the cores 26 of the optical fibers 22a and 22b have discrete FBGs 23 whereas the core 26 of the optical fiber 22c has a continuous FBG 23' inscribed along its length. It is intended that any one of the optical fibers 22 of the optical fiber device 12 can have at least a discrete FBG and/or at least a continuous FBG, depending on the embodiment. It is envisaged that using continuous FBGs, such as the ROGUE FBG described in detail below, can provide a continuous enhancement. Instead of using FBGs at discrete locations, the entire optical fiber's length can provide backscattered signal. During signal processing, using OFDR and/or OTDR sensing techniques, sensing can thus be performed at a multitude of points along the fiber's length. The spacing between each of those sensing points defines the spatial resolution. Contrarily to conventional FBG sensing schemes, those sensing points can be anywhere on the fiber, and the sensor spacing can be tuned, e.g., depending on signal acquisition and processing times, as well as scanned bandwidth. The shape sensing algorithm afterwards may be similar as it not only depend on the positioning of the discrete FBGs, but on the sensor spacing set by the interrogator data processing. Otherwise, the reflected light can include Rayleigh scattering, for instance. To reduce undesirable effects of temperature during the strain measurements, the sheath 30 of the optical fiber device 12 can provide at least some thermal insulation.

The optical fibers 22a, 22b and 22c allow at least two non-coplanar pairs of optical fibers to be formed. For instance, in this embodiment, the optical fibers 22a and 22b form a first pair of optical fibers lying in a first plane 34a, and the optical fibers 22a and 22c form a second pair of optical fibers lying in a second plane 34b that is not coplanar with the first plane 34a. As having only the first pair of optical fibers would allow reconstruction of the bending of the corresponding waveguide only in the first plane 34a, having the two non-coplanar pairs of optical fibers can allow reconstruction of the bending of the corresponding waveguide in both the first and second planes 34a and 34b, thus allowing a three dimensional model of the optical fiber device 12 to be determined based on the known geometrical relationship between the optical fibers 22a, 22b and 22c.

It was found that limiting the variation in the positioning of the optical fibers 22a, 22b and 22c along a length of the optical fiber device 12 could result in more accurate shape sensing. Indeed, should the geometrical relationship between the optical fibers 22a, 22b and 22c vary uncontrollably along the length of the optical fiber device 12, undesirable biases could be introduced in the shape sensing. There is therefore described herein methods and systems for fabricating an optical fiber device destined for shape sensing applications and any other suitable sensing applications.

Figure 3:
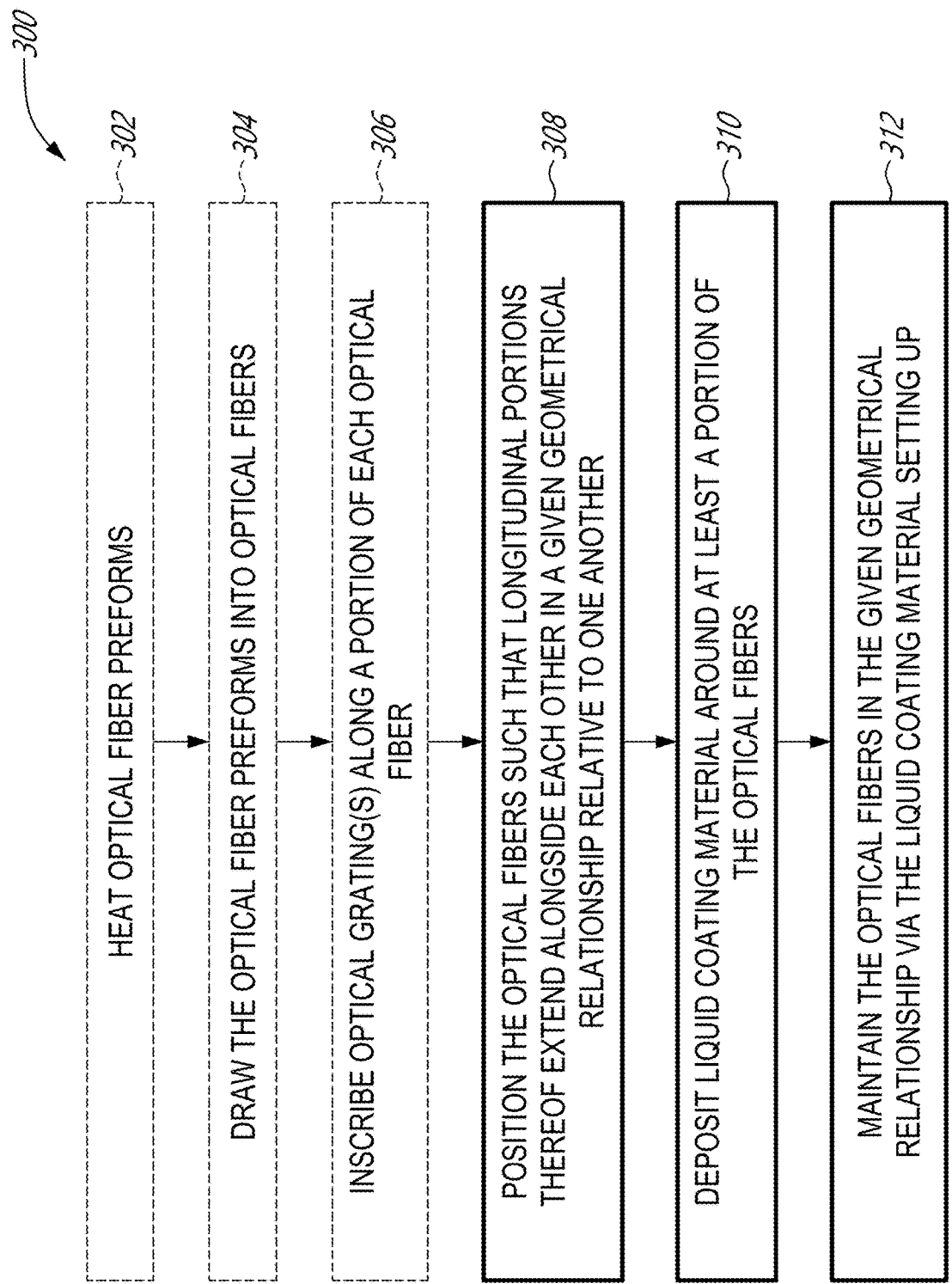
FIG. 3 is a flow chart of an example method of fabricating an optical fiber device, in accordance with one or more embodiments.

FIG. 3 shows an example method 300 of fabricating an optical fiber device. Description of the method 300 will be made with respect to the optical fiber device 12 of FIG. 2 for ease of reading, with references to FIGS. 4A, 4B and 4C.

At step 308, longitudinal portions 36a, 36b and 36c of the optical fibers 22a, 22b and 22c are positioned alongside each other in a given geometrical relationship 38, an example of which is shown at FIG. 4A.

At step 310, liquid coating material 40 is deposited around the longitudinal portions 36a, 36b and 36c of the optical fibers 22a, 22b and 22c, such as shown at FIG. 4B.

At step 312, and as illustrated at FIG. 4C, the liquid coating material 40 sets up around the longitudinal portions 36a, 36b and 36c of the optical fibers 22a, 22b and 22c, to form the body 20, thereby maintaining the given geometrical relationship 38 along the longitudinal portions 36a, 36b and 36c.

As such, as long as the positioning of the optical fibers 22a, 22b and 22c relative to one another is maintained until the liquid coating material 40 set up, the given geometrical relationship 38 can be expected to be maintained all along the longitudinal portions 36a, 36b and 36c of the optical fibers 22a, 22b and 22c of the optical fiber device 12.

In some embodiments, the optical fibers 22a, 22b and 22c have one or more outer claddings or jackets which are removed prior to performing steps 308, 310 and 312. However, in some other embodiments, the optical fibers 22a, 22b and 22c can also be freshly drawn optical fibers. For instance, in such embodiments, the method 300 can have a step 302 of, prior to steps 308, 310 and 312, heating optical fiber preforms and drawing the optical fiber preforms into the optical fibers 22a, 22b and 22c, using for instance a draw tower. In embodiments where FBGs are to be inscribed along the cores 26 of the optical fibers 22a, 22b and 22c, a step 304 of inscribing the FBGs 23 along the cores 26 of the optical fibers 22a, 22b and 22c can be performed before the steps 308, 310 and 312, too. In such embodiments, removing the outer claddings and/or jackets is not necessary as the freshly drawn optical fibers may be exempt of such outer claddings and/or jackets. Moreover, it can be anticipated that so-fabricated optical fiber devices may be more sensitive to induced strains, as the absence of outer claddings and/or jackets can allow the optical fibers within the optical fiber devices to be more flexible.

It will be appreciated that any suitable liquid coating material deposition technique can be used. Examples of such liquid coating material deposition techniques can include, but not limited, extrusion, injection moulding and the like.

Figure 5:
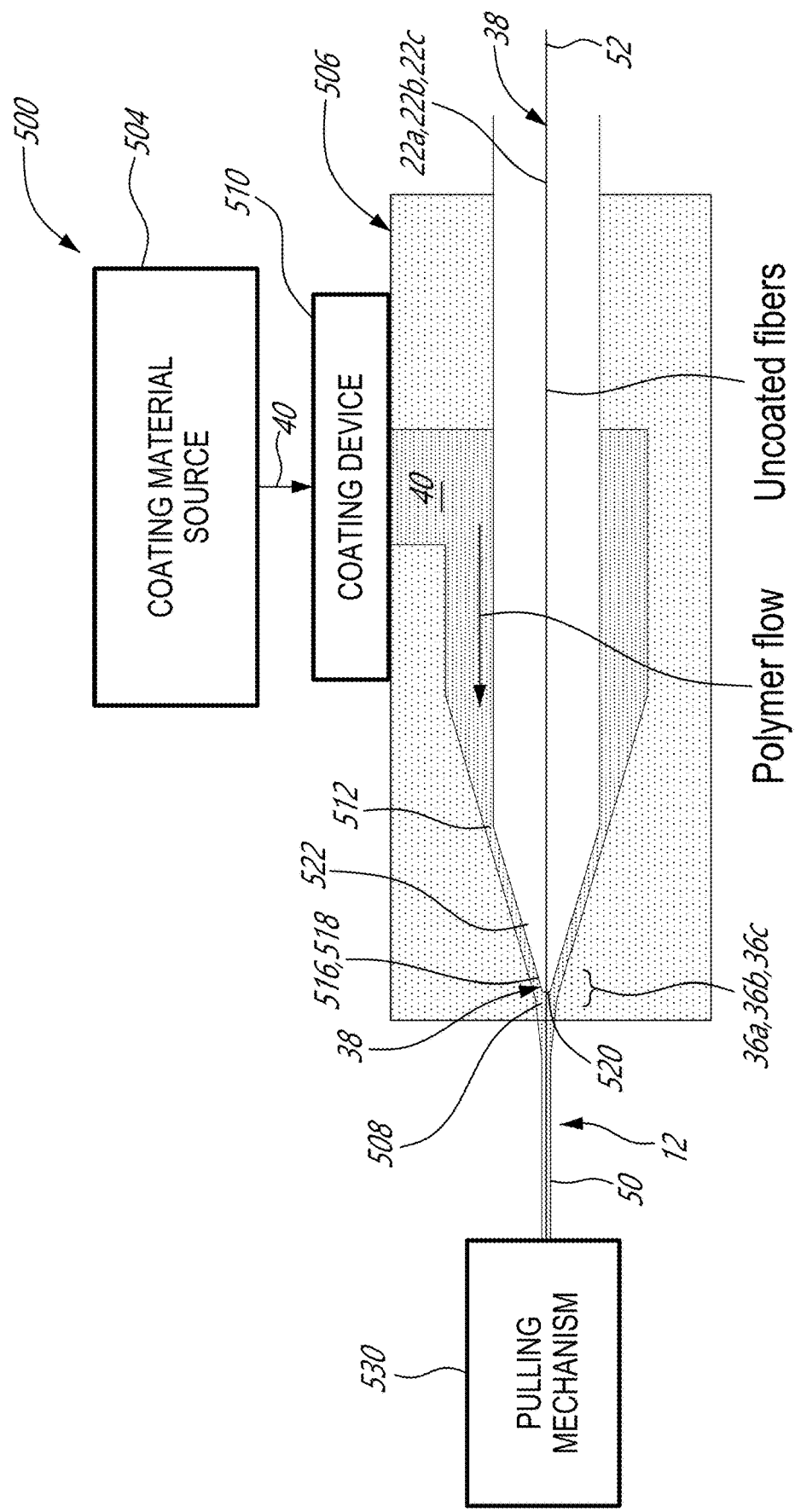
FIG. 5 is a schematic view of an example of a system for fabricating an optical fiber device, in accordance with one or more embodiments.

FIG. 5 shows an example of a system 500 for fabricating an optical fiber device, in accordance with an embodiment. Description of FIG. 5 is made with respect to the optical fiber device 12 for ease of reading. As depicted, the system 500 has a coating material source 504, a die 506, an optical fiber positioner 508, and a coating device 510.

As can be expected, the coating material source 504 has liquid coating material 40. In some embodiments, the coating material source 504 has a heater melting solid coating material to obtain the liquid coating material 40.

The die 506 has a longitudinal conduit 512 receiving the optical fibers 22a, 22b and 22c extending alongside each other. The optical fibers 22a, 22b and 22c are maintained in the geometrical relationship 38 relative to one another thanks to the optical fiber positioner 508. The length of the longitudinal conduit 512 can vary from one embodiment to another, as it could be relatively long or short, depending on the embodiment.

In some embodiments, the optical fiber positioner 508 can be partially or wholly outside the longitudinal conduit 512 of the die 506. For instance, opposite ends 50 and 52 of the optical fibers 22a, 22b and 22c can be pulled away from one another, while being maintained in the given geometrical relationship 38, by the optical fiber positioner 508, thereby forcing the optical fibers 22a, 22b and 22c to maintain the given geometrical relationship 38 all along their lengths during deposition of the liquid coating material 40.

However, in this specific embodiment, the optical fiber positioner 508 is partially within the longitudinal conduit 512 of the die 506. More specifically, the optical fiber positioner 508 includes a nozzle 516 having an opening 518 with an inner surface 520 of a given shape, and an outer surface 522 upon which the liquid coating material 40 can flow. It is intended that the inner surface 520 of the nozzle 516 receives the longitudinal portions 36a, 36b and 36c of the optical fibers 22a, 22b and 22c and confines them into the given geometrical relationship 38 during deposition of the liquid coating material 40. As such, the dimension of the opening 518 of the nozzle 516 can be designed to snugly receive the longitudinal portions 36a, 36b and 36c of the optical fibers 22a, 22b and 22c. The snugger the engagement between the inner surface 520 and the longitudinal portions 36a, 36b and 36c of the optical fibers 22a, 22b and 22c is, the tighter the tolerance can be on the desired geometrical relationship. For instance, in some embodiments, the opening 518 of the nozzle 516 has a dimension below 1 mm, preferably below 500 µm and more preferably below 300 µm.

The deposition of the liquid coating material 40 is performed by the coating device 510 which is in fluid communication with the coating material source 504 and with the longitudinal conduit 512 of the die 506. As shown, the coating device 510 flows the liquid coating material 40 towards the longitudinal portions 36a, 36b and 36c of the optical fibers 22a, 22b and 22c, as they are received in the longitudinal conduit 512 and positioned in the given geometrical relationship 38 by the optical fiber positioner 508.

As shown, the deposition step can include extruding the liquid coating material 40 around the longitudinal portions 36a, 36b and 36c of the optical fibers 22a, 22b and 22c via the nozzle 516 while maintaining the given geometrical relationship 38. In such an embodiment, the extruding can include a step of forcing the liquid coating material 40 at a longitudinal position around the longitudinal portions 36a, 36b and 36c and moving the longitudinal portions 36a, 36b and 36c of the optical fibers 22a, 22b and 22c longitudinally during the forcing of the liquid coating material 40. The movement can be in either longitudinal direction. In the embodiment illustrated in FIG. 5, the movement is towards the left-hand side of the page. As shown in this example, a pulling mechanism 530 is used to longitudinally pull on at least the ends 50 of the optical fibers 22a, 22b and 22c. In this example, the pulling mechanism 530 also maintains the optical fibers 22a, 22b and 22c parallel to one another during the deposition of the liquid coating material 40.

As can be expected, when the longitudinal portions 36a, 36b and 36c are moved away from the die 506, the liquid coating material 40 can cool and set up into position, thereby maintaining the given geometrical relationship 38 between the optical fibers 22a, 22b and 22c. In some embodiments, a cooler is provided to help the liquid coating material 40 to set up around the longitudinal portions 36a, 36b and 36c. The cooler can be a forced airflow cooler, a liquid cooler and/or a Peltier module.

Figure 6:
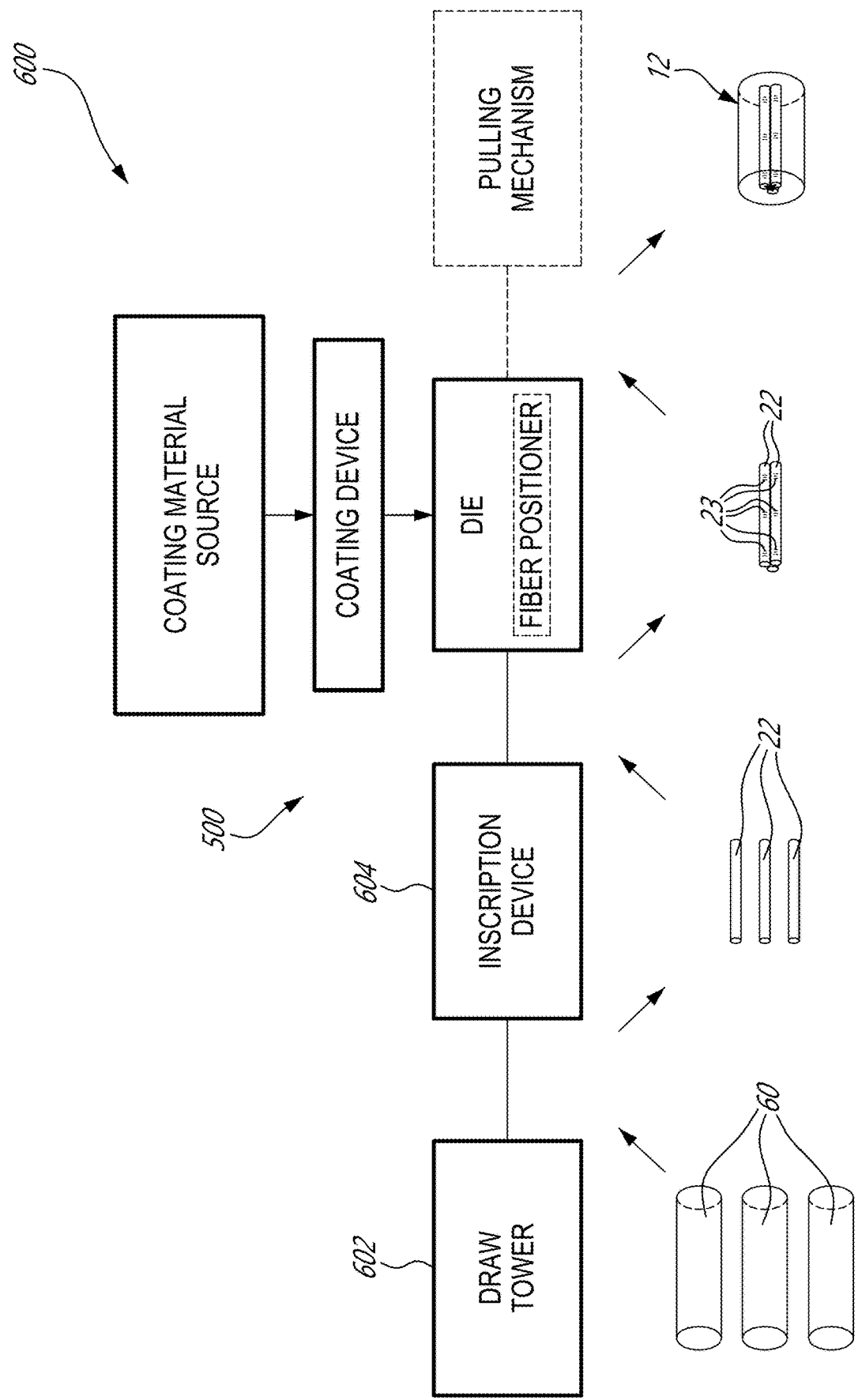
FIG. 6 is a schematic view of the system of FIG. 5, showing a draw tower and an inscription device, in accordance with one or more embodiments.

FIG. 6 shows the system 500 as part of a larger system 600 performing the method 300 described above with reference to FIG. 3. As shown in this example, the system 600 has a draw tower 602 which can heat optical fiber preforms 60 and draw the optical fiber preforms 60 to form the optical fibers 22. The system 600 also has an inscription device 604 downstream from the draw tower 602 and upstream from the system 500. As shown in this example, the inscription device 604 is used for inscribing one or more FBGs 23 along a longitudinal portion of each of the optical fibers 22. In some embodiments, described below, at least one of the FBGs 23 has a random continuous distribution such that a return signal propagating theralong has a full width at half maximum bandwidth ranging between about 0.1 THz and about 40 THz. It is intended that by inscribing the FBGs 23 and/or ROGUE FBGs 23' along the optical fibers 22 directly after the drawing process may circumvent an optional step of covering the optical fibers 22 with one or more outer claddings and/or jackets, which can inconveniently impede the flexibility of the optical fibers 22 and/or the resulting accuracy of the optical fiber device 12 in shape sensing applications. A step of removing the outer claddings and/or jackets can also be omitted. In such embodiments, the body 20 of coating material can act as the outer cladding and protect the optical fibers 22 during use. It is intended that the FBGs can be omitted, as Rayleigh scattering may provide sufficient return signal to perform induced-strain measurements using the optical fiber device 12.

Example 1—Extruded Optical Fiber Triplets for 3D Shape Sensing for Minimally Invasive Surgery Minimally invasive surgery offers a patient the advantage of faster recovery and reduces the risks of complications. In order to perform such surgery, the physician needs to monitor the position and the shape of the catheter and/or needle being used. Optical fibers have been used as sensors that allow real time guidance to the surgeon. Optical fibers are widely used for biomedical sensing. With the advantage of being very flexible and electromagnetically inactive, they can be interesting for use as sensors in flexible needles and/or catheters and may be used with MRI at the same time. Shape sensors usually rely on fiber strain measurement of each fiber of a triplet, as described above. When the triplet forms a triangle in cross-section, the relative strain difference between the optical fibers at each point provides the curvature values and directions along the entire length of the optical fiber device, which can be processed to determine the shape of the optical fiber device. Strain measurement using the optical fiber device may be performed using various methods. The most common method is to incorporate one or more FBGs in the optical fibers and then relate the Bragg wavelength variation to the fiber strain. Such a method can achieve high accuracy for simple shapes thanks to the high SNR it may provide. In this example, a set of nine FBGs were positioned at three longitudinal positions along the optical fibers of the fiber triplet, with three FBGs at each longitudinal position. The curvature information can therefore be available only at these specific positions (e.g., typically at 3 strategic points of a 20 cm long optical fiber device), and hence the curvature has to be inferred from these points. The limited number of monitored points can induce errors during the shape determination, especially when the shape cannot be approximated as a simple function. Another way to obtain the strain of the optical fiber device is by using Rayleigh backscatter. The Rayleigh backscatter signal in a fiber can be related to local strain which makes the same process possible, using OFDR, with the advantage of acquiring distributed information along the entire length of the optical fiber sensor. Since the Rayleigh signal is usually very low, it can lead to a very poor SNR, and may not allow the addition of in-line optical components for signal processing due to poor insertion loss tolerance. It has been shown that the backscatter signal can be significantly enhanced by UV exposure, which makes this method promising. In some embodiments, the FBGs are provided in the form of Random Optical Fiber Gratings written by UV or ultrafast laser Exposure, referred to as ROGUE FBGs herein, thereby enhancing backscatter of each of the individual optical fibers. Such ROGUE FBGs have shown a 50 dB enhancement in backscatter in the sensing wavelength range. Knowing precisely the position of each fiber in the sensor can greatly improve bend sensing accuracy.

It is possible to characterize every single optical fiber in the triplet, and correct the shape measurements accordingly in post-processing. However, doing so could be inconveniently time- and resource-consuming. There is thus described a method of fabricating the triplet, which can limit variation in the positioning of the optical fibers of the triplet along a given length, thereby rendering moot any previous characterization steps. In some embodiments, the method can involve an extrusion process which can offer precision, as well as possibility to add various sensors in the body of coating material simultaneously, producing a complex composite protected optical fiber device in a single extrusion step. Such a fabrication method is particularly convenient for optical fibers having ROGUE FBGs as these are generally written into uncoated optical fibers. Indeed, depositing coating material therearound through an extrusion process can greatly improve the durability of the resulting optical fiber device.

This example proposes a process to manufacture optical fiber devices for shape sensors which can be used in a number of biomedical applications. In this example, a polymer extrusion process is performed on three optical fibers, thereby forming an optical fiber device with a diameter below 600 µm. Accordingly, the optical fiber device can be inserted into surgical needles, catheters and the like in at least some biomedical applications. As described above, the three optical fibers are fixed into a given geometrical relationship to form a fiber triplet in this example. The position of the fiber triplet within the body of coating and the angle of the fiber triplet are parameters that can be advantageously controlled to enhance shape measurements. The radial and angular positions of the optical fibers in the triplet are measured with an accuracy of 3 µm and 4 degrees, respectively, in the present example. At least within the context of OFDR measurements, it was demonstrated that an optical fiber device incorporating optical fibers with ROGUE FBGs could enhance shape sensing.

Similarly to as shown in FIG. 5, the depositing of the coating material is performed using a twin-screw extruder from Leistritz. As depicted, the die is used in a way that the three optical fibers are coated with the coating material simultaneously as their relative positioning is maintained. The lower screw speed that could be reached was 4.2 rotations per minute. The fibers were pulled at a speed of 17 cm-s-1. The temperature profile along the die was a humped profile starting at 130 degrees Celsius in a first zone, gradually increasing to 195 degrees Celsius in a melt zone and slowly decreasing to 160 degrees Celsius in the head of the die. The optical fibers used were either uncoated SMF-28 (125 µm diameter) incorporating random gratings or polyimide coated SMF-28 (155 µm diameter) optical fiber. The extrusion tip diameter was 660 µm. The head exit had an opening of 940 µm. Once coated, the optical fibers were cooled using a cooler providing a forced airflow. This cooling method can induce a turbulence at the exit of the die which can compromise the uniform and constant positioning of the optical fibers of the triplet. Accordingly, a cooler providing water-cooling was used instead to solve the turbulence challenge. The coating material used in this example is a polymer, and more specifically the M6823MZ from Total, which is a random copolymer made of polypropylene and ethylene. It has been chosen for at least two reasons in this specific example. First, its melting point is at 136 degrees Celsius, which proved to be a convenient not to damage the optical fibers and/or erase the FBGs inscribed therein. Secondly, its Melt Flow Index (MFI) is 30 g/10 min, which appeared to be an acceptable compromise between a fluidity that allow the extrusion of a thin enough coating and a melt strength high enough, so the optical fibers do not slip inside the optical fiber positioner once it has set when the optical fibers undergo strain.

Figure 7B:
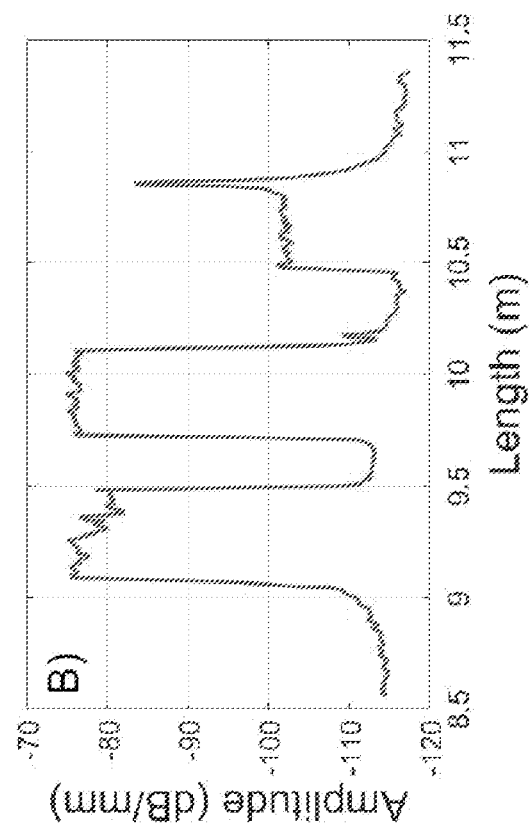
FIG. 7B is a graph showing amplitude as function of length of the example optical fiber device of FIG. 7A, in accordance with one or more embodiments.
Figure 7A:
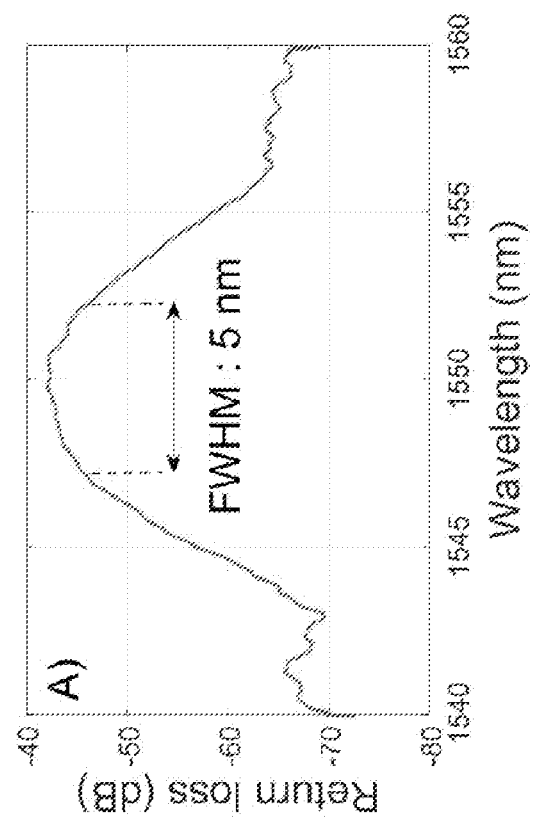
FIG. 7A is a graph showing return loss as function of wavelength, as measured using an example optical fiber device, in accordance with one or more embodiments.

Sensing was performed using three 35 cm long ROGUE FBGs with a respective 45 dB, 50 dB and 25 dB backscatter enhancement on a 5 nm bandwidth centered at a wavelength of 1549.7 nm, as shown in FIG. 7A. The backscatter measurement has been performed using an optical backscatter reflectometer (Model OBR 4600 from Luna Innovations Inc). The enhancement backscatter was found to be more than sufficient to enable the three ROGUE FBGs to be connected together to the source of the optical interrogated simultaneously using a 1×3 coupler with a different delay before each ROGUE FBG. These measurements can be seen in FIG. 7B. The scanning was performed on a 5.24 nm wavelength range centered at 1550.5 nm.

Figure 8B:
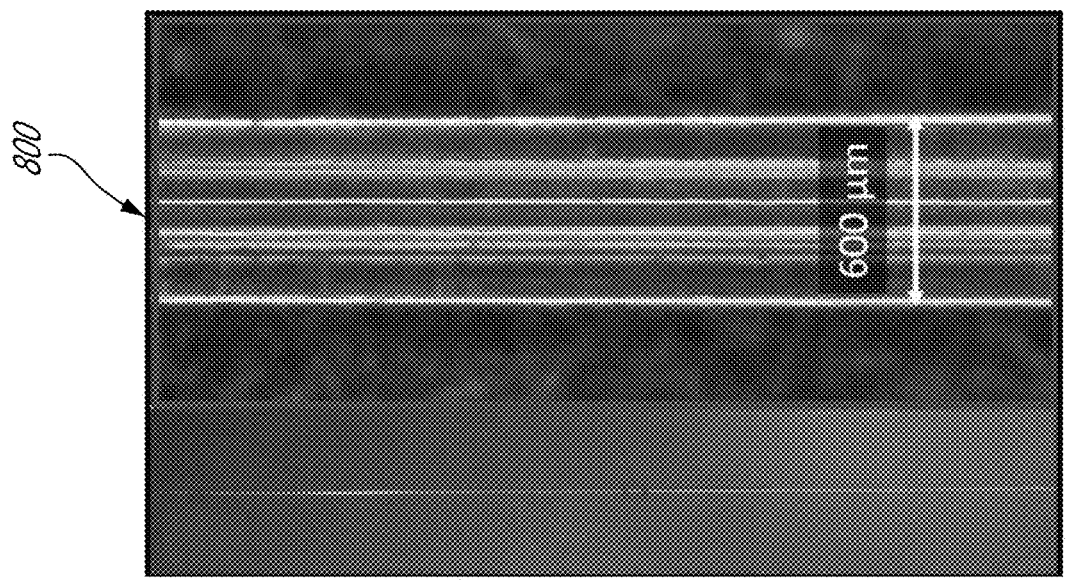
FIG. 8B is a top plan view of the example optical fiber device of FIG. 7A, in accordance with one or more embodiments.
Figure 8A:
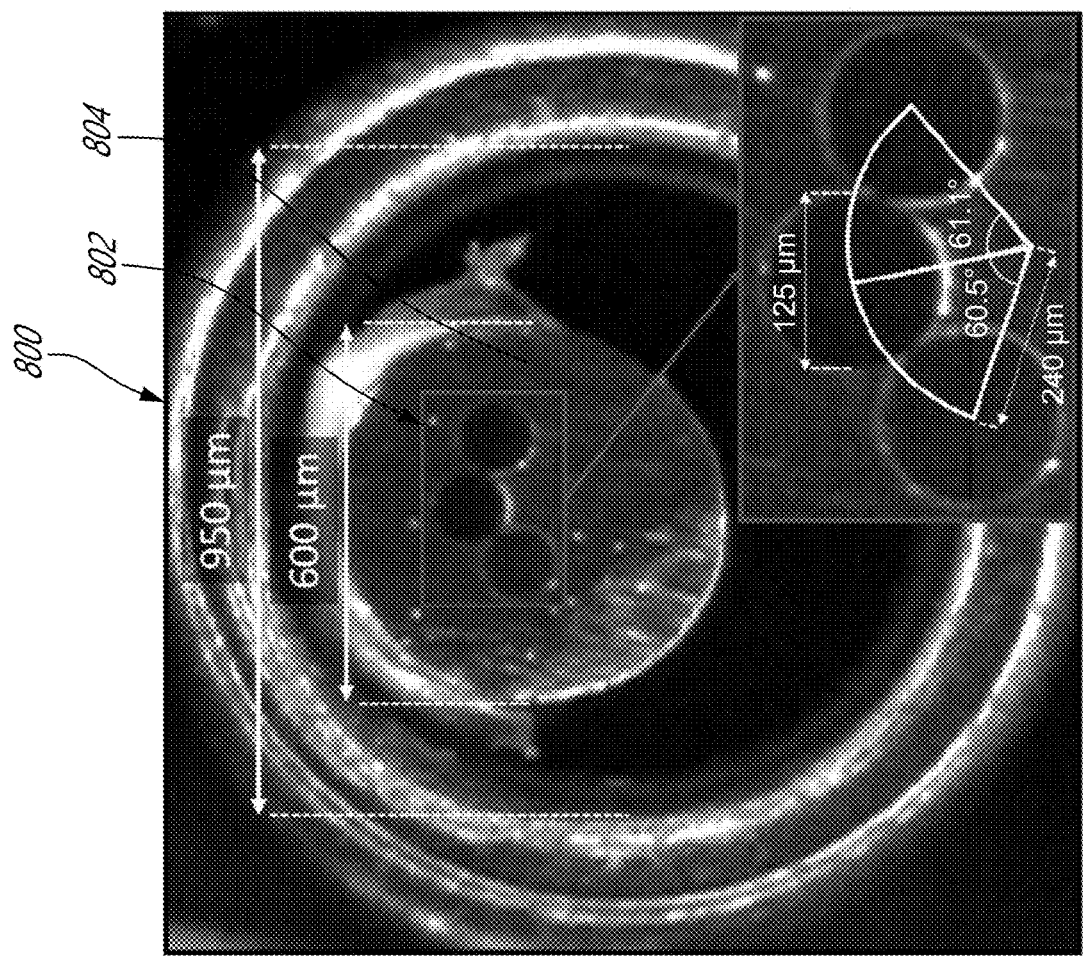
FIG. 8A is a cross sectional view of the example optical fiber device of FIG. 7A, in accordance with one or more embodiments.

Measurement over 20 cm showed that the angle formed by the three optical fibers was stable within ±2 degrees. Furthermore, the center of the fiber triangle is stable within ±1.5 µm from the center of the body of coating material. However, the absolute values may change from one extrusion to another. FIG. 8A shows a transversal view of an example of an optical fiber device 800, with an optical fiber triplet 802 surrounded by a body 804 of material. Although it can be seen that the triangle is not necessarily equilateral (which may be an optical form for shape sensing with three fibers), it is however always isosceles. The triangle shape can be better controlled by customizing the extrusion head tip. The 600 µm diameter triplet is small enough to go through the 950 µm diameter hole catheter. FIG. 8B shows a top view of the optical fiber device 800. The coating diameter (~600 µm) has a variability of around ±5%. However, even if the triangle formed by the fibers keep the same shape within the coating and its radial position remains stable, a huge variability was noticed (more than 30 degrees) in the angular position of the triangle relatively to the coating center. The turbulence generated from air cooling at the extrusion head exit could explain this observation. Improved results can be expected once a smoother cooling process is set up. An advantage that was noticed was the space left in the body of coating material. Such space could be filled with one or more optical fibers, wires and/or capillaries in order to make a multimodal sensor/surgical tool.

Figures 9, 9A, 9B:
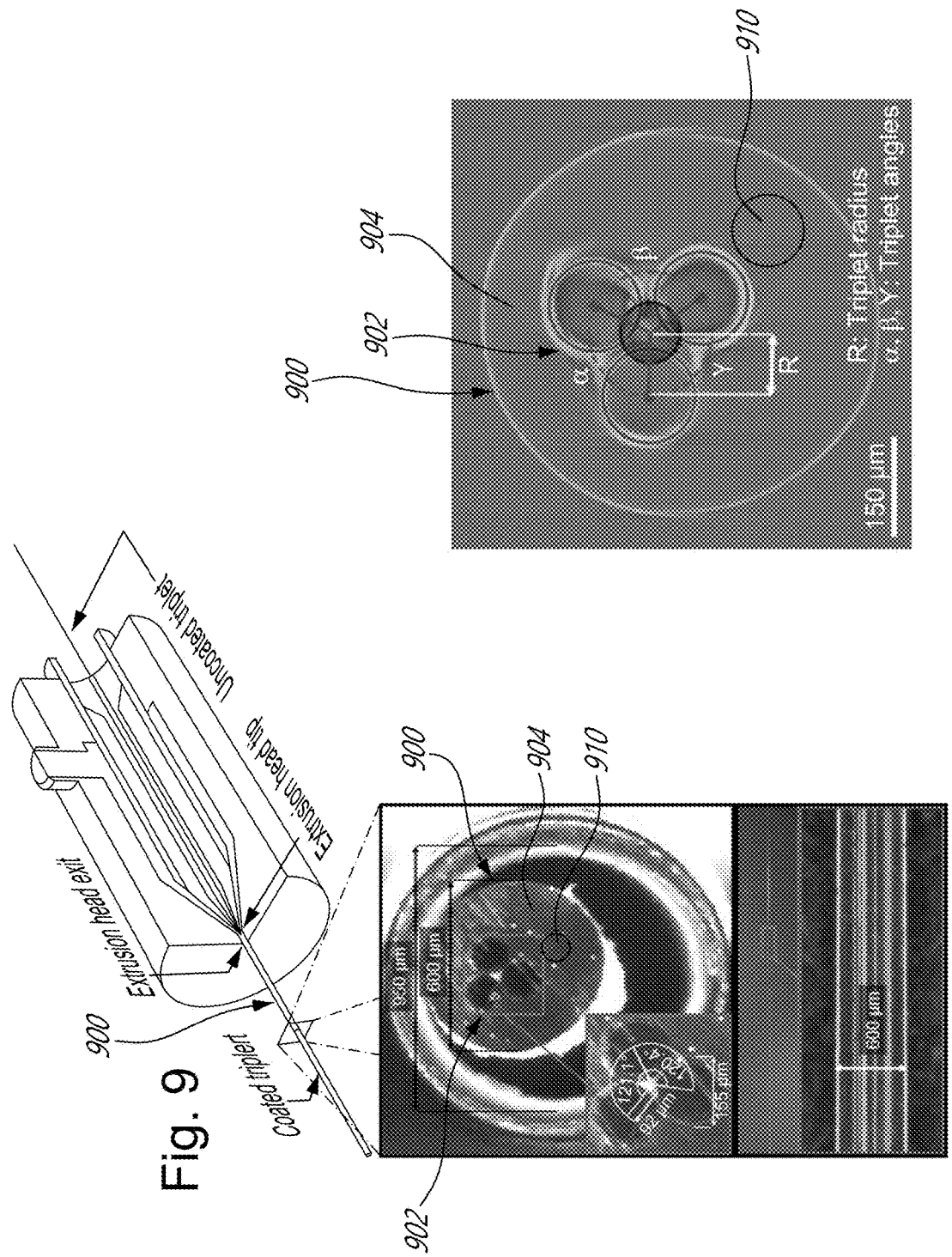
FIG. 9 is an oblique view of another example of an optical fiber device, in accordance with one or more embodiments.
FIG. 9A includes cross-sectional and top plan views of the optical fiber device of FIG. 9, in accordance with one or more embodiments.
FIG. 9B is a cross-sectional view of the optical fiber device of FIG. 9, with an optical fiber triplet maintained in an exemplary geometrical relationship, in accordance with one or more embodiments.
Figure 10A:
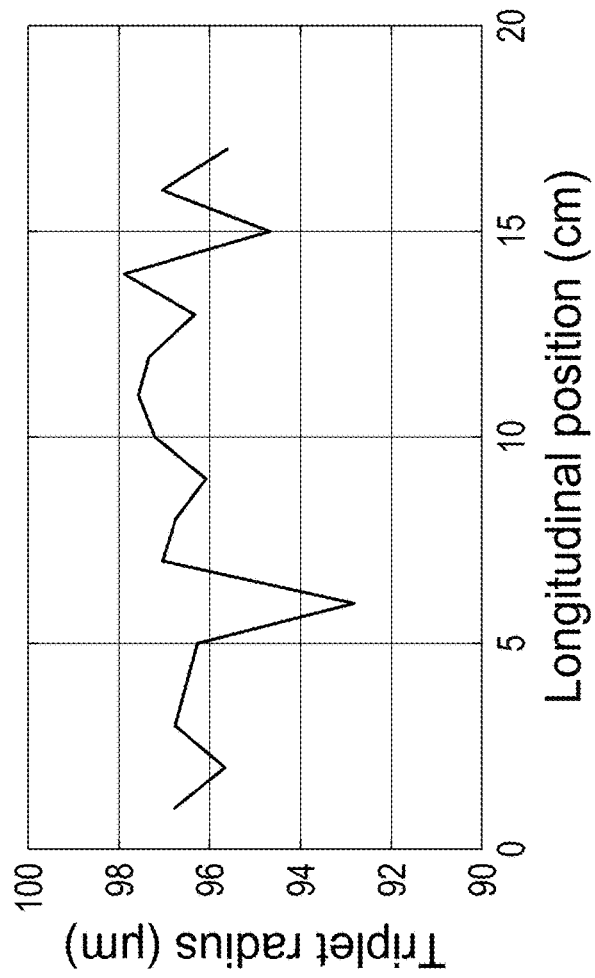
FIG. 10A is a graph showing radius of the optical fiber triplet of FIG. 9B as function of a length of the optical fiber device of FIG. 9, in accordance with one or more embodiments.
Figure 10B:
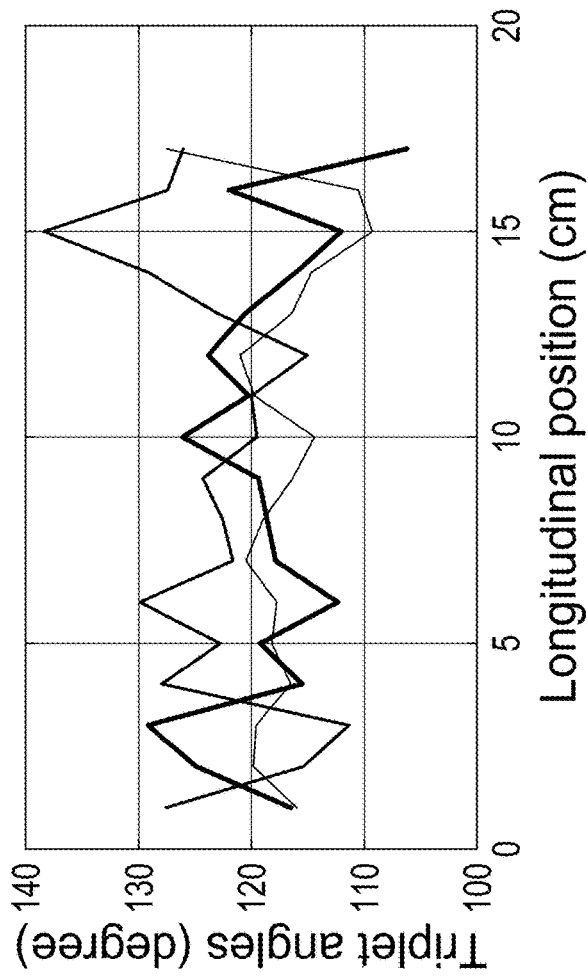
FIG. 10B is a graph showing angles of the optical fiber triplet of FIG. 9B as function of a length of the optical fiber device of FIG. 9, in accordance with one or more embodiments.

FIGS. 9, 9A and 9B shows another example of an optical fiber device 900 fabricated using the method described herein. In this specific example, the optical fiber device 900 has an optical fiber triplet 902 surrounded by a body 904 of coating material. In this example, the optical fibers have a diameter of 155 µm thereby filling more of the opening of the inner surface of the nozzle during the coating material deposition process. As the engagement between the inner surface of the nozzle and the optical fibers is snugger, the optical fibers were more squeezed within the inner surface of the nozzle which forced them to be closely adjoining to one another thereby forming the illustrated equilateral triangle shape. It is intended that the optical fiber device 900 can include at least an additional component 910 relative to the optical fiber triplet 902 inside said body 904 of coating material. The additional component can be one or more of any one of the following group of components: an electrical wire, a conductive glass fiber, a capillary fiber, a photonic crystal fiber, a laser delivery fiber and any other suitable component. FIGS. 10A and 10B show radius and angle variations along a length of the optical fiber device 900.

Strain measurement using the LUNA OBR4600 shows a stability around of 1% (typically few micro-strain variability for a few hundred micro-strain measurement) when repeating a measurement of a same shape. However, the previously discussed unknown and random twist of the triplet along the body of coating material can make the shape reconstruction more challenging. Regardless, the potential for excellent strain measurement accuracy will allow highly accurate shape reconstruction results using the so-fabricated optical fiber device.

In this example, optical fiber triplets for sensor applications have been fabricated using direct polymer extrusion. The extrusion process seems to make the manufacturing of fibers triplet possible at reduced cost since one extrusion can generate an arbitrarily long triplet with a good stability in a single extrusion iteration with respect to geometric parameters. In some embodiments, it is envisaged that a more effective and less aggressive cooling method can be used to reduce any angular position variability of the triplet within the body of coating material. Another advantage of the extrusion process is that it is very flexible. It would be easy to insert more optical fibers, electrical wires sensors and/or other sensing/surgical tools within the body of coating material for additional functionality. A single fiber could be added in order to measure the temperature along with a strain measurement in parallel to measure ambient changes during shape sensing, which could thereby allow the strain measurements to be compensated with local temperature variations. Another advantage to such an extrusion process is that the availability of a huge variety of polymers provides a large choice of coating properties for specific applications.

For strain measurements, the strong backscattered signal of the ROGUE FBG was found to be convenient. The signal may be strong enough to accommodate an insertion loss factor of 10 dB (forward and return loss in a 1×3 coupler) while still maintaining a good SNR for accurate strain measurement, even when scanning a relatively narrow band (5.24 nm). Furthermore, the simultaneous measurement coupled with the narrow band scan make the response time such that perform shape sensing in real time may be envisaged.

Other aspects of the present disclosure may encompass improvements generally relating to distributed temperature and strain optical sensing (hereinafter "DTSS") systems and more specifically relating to fiber-based DTSS systems.

Figure 11:
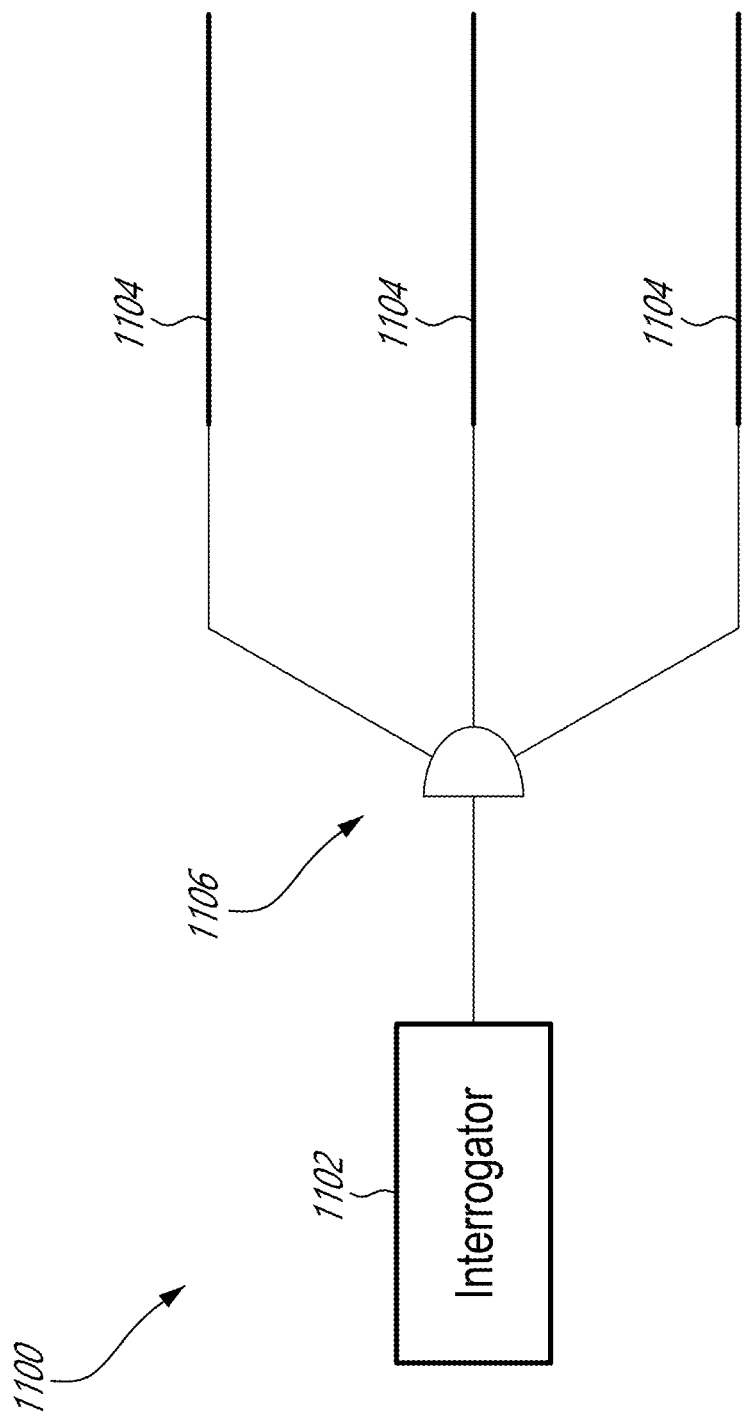
FIG. 11 is a schematic view of an example of a DTSS system, in accordance with the prior art.

Typical DTSS systems generally include an optical interrogator which is optically coupled to a sensing optical fiber. The optical interrogator is configured for emitting an optical signal along the sensing optical fiber, and for receiving a return optical signal returning from the sensing optical fiber as the optical signal propagates along the sensing optical fiber. Measuring temperature change(s) and/or strain change (s) to which the sensing optical fiber are subject can be done by performing several measurements over time. In at least some situations, it may be convenient to monitor temperature change(s) and/or strain change(s) using a plurality of sensing optical fibers to monitor different environments or parts at once. To do so, it is known to use the plurality of optical fibers concurrently with a corresponding plurality of optical interrogators or to couple the sensing optical fibers to a single a multi-channel optical interrogator. In some other situations, a single optical interrogator 1102 is sequentially optically coupled to a plurality of optical sensing optical fibers 1104 using an optical switch 1106, as shown in the existing DTSS system 1100 of FIG. 11. Although existing DTSS systems are satisfactory to a certain extent, there remains room for improvement. For instance, using the two former options can be costly whereas the latter option is only limited to sequential measurements.

Figure 12:
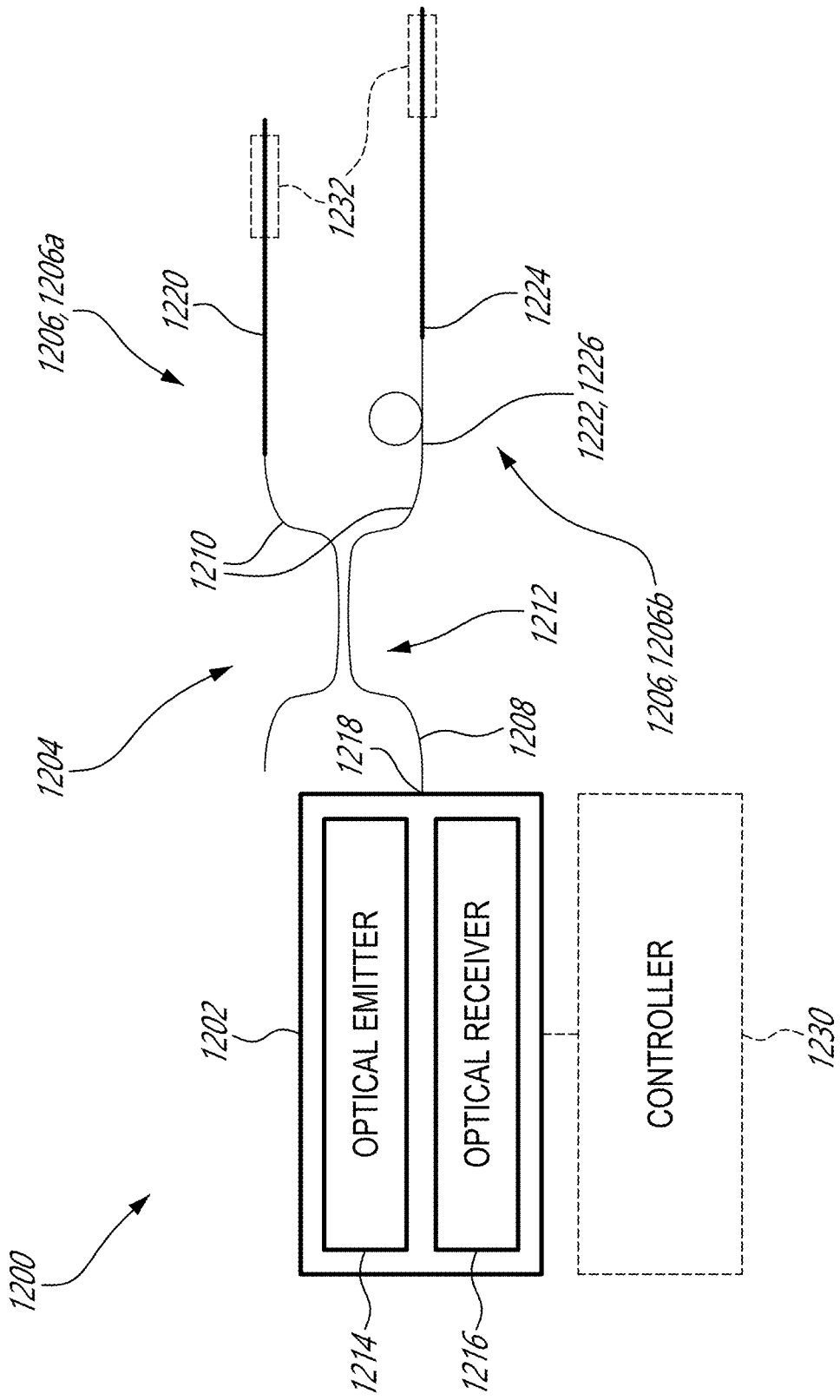
FIG. 12 is a schematic view of an example of a DTSS system, in accordance with one or more embodiments.

FIG. 12 shows an example of a DTSS system 1200, in accordance with an embodiment. As depicted, the DTSS system 1200 has an optical interrogator 1202, an optical coupler assembly 1204 which is optically coupled to the optical interrogator 1202 and a plurality of optical fiber devices 1206 which are optically connected to the optical coupler assembly 1204.

More specifically, in this example, the optical coupler assembly 1204 has an input 1208 being optically coupled to the optical interrogator 1202 and a plurality of outputs 1210 to which are optically connected the optical fiber devices 1206. As shown, the optical coupler assembly 1204 is provided in the form of a two-by-two (e.g., a 50:50) fiber coupler 1212 in this example. This two-by-two fiber coupler 1212 can be referred to as a one-by-two fiber coupler by at least some manufacturers. Nevertheless, two-by-two fiber couplers and/or one-by-two couplers could be used in the DTSS system 1200. Accordingly, the input 1208 is referred herein to as an optical fiber input 1208 and the outputs 1210 are referred to as optical fiber outputs 1210. However, other types of optical coupler assemblies could alternately be used. For instance, non-fibered coupler assemblies such as free-space coupler assemblies could be used in some other embodiments.

As such, during use, the optical interrogator 1202 is configured for emitting an optical signal at the optical fiber input 1208 which will be propagated, at least to a certain extent, along the optical fiber outputs 1210 and then to the optical fiber devices 1206. The optical interrogator 1202 is configured for receiving, in response to the emission of the optical signal, one or more return signals returning from corresponding ones of the optical fiber devices 1206. As shown, the optical interrogator 1202 has an optical emitter 1214 for emitting the optical signal and an optical receiver 1216 for receiving the return signal. Examples of such optical emitter 1214 and receiver 1216 are presented below. As can be understood, the optical interrogator 1202 typically has an internal optical coupler (not shown) so as to allow emission and reception of optical signals at a single optical port 1218, to which the optical fiber input 1208 of the optical coupler 1212 is connected in this example. In some other embodiments, an optical circulator could have been used instead of or in addition to the internal optical coupler.

In the illustrated example, the optical fiber devices 1206 have first and second optical fiber devices 1206a and 1206b. The first optical fiber device 1206a has a first sensing optical fiber 1220 which is serially connected to a first one of the optical fiber outputs 1210 of the optical coupler assembly 1204. The second optical fiber device 1206b has an optical path extender 1222 which is serially connected to a second one of the optical fiber outputs 1210, and a second sensing optical fiber 1224 which is serially connected to the optical path extender 1222.

As shown in this example, the optical path extender 1222 is provided in the form of a length of optical fiber which extends the optical path length of an optical signal propagating therein. The optical path extender 1222 shown in this example can thus be referred to as a delaying optical fiber 1226. However, in some other embodiments, the optical path extender 1222 can be provided in the form of a multipass cell in which the optical patch is increased by a series of reflections on a plurality of reflective surfaces or in the form of other types of optical path extenders.

More specifically, the delaying optical fiber 1226 has an optical path length which is equal to or greater than an optical path length of the first optical fiber device 1206a. In this way, during use, the optical interrogator 1202 is configured for receiving, in response to the emission of the optical signal at the optical coupler assembly 1204, a first return optical signal returning from the first sensing optical fiber 1220 and a second return optical signal returning from the second sensing optical fiber 1224.

Figure 12A:
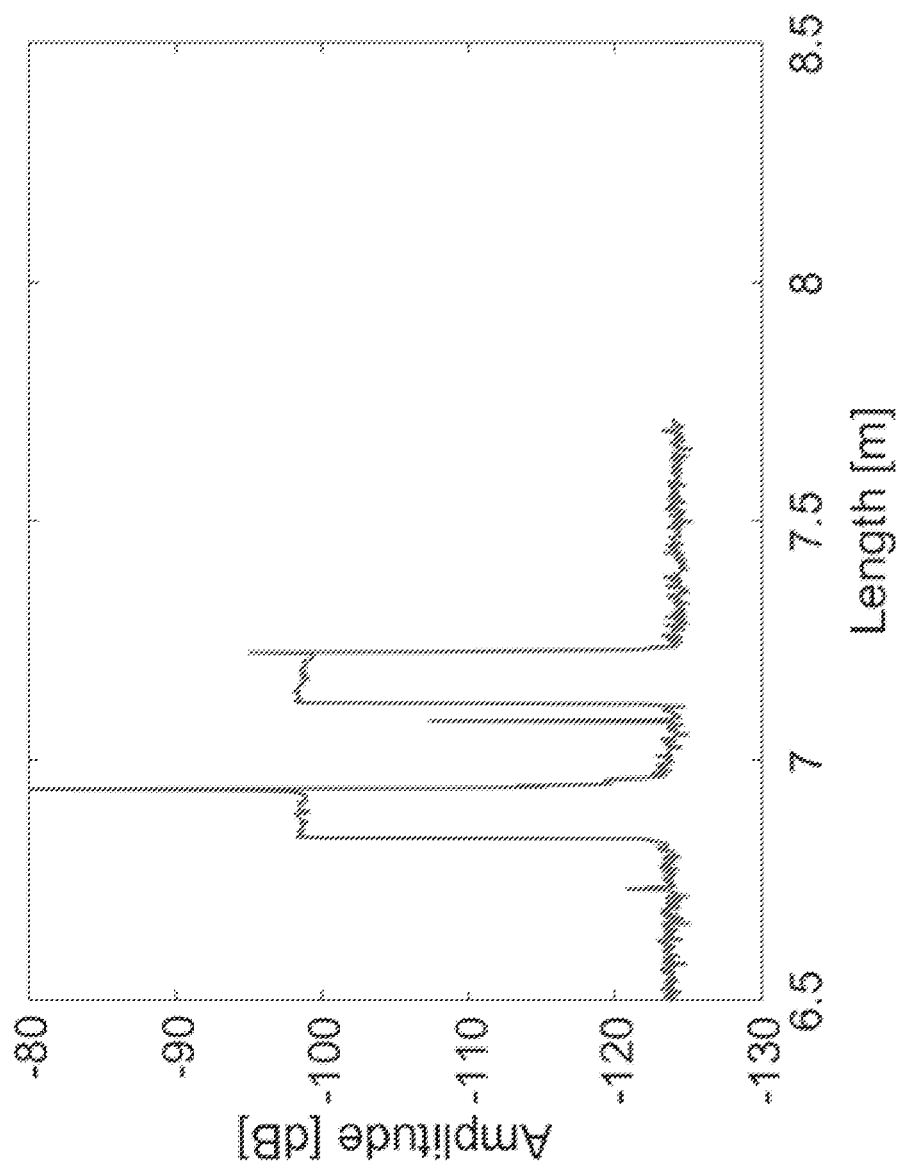
FIG. 12A is a graph showing exemplary data produced by the DTSS system of FIG. 12, in accordance with one or more embodiments.

As can be understood, due to the extended optical path caused by the presence of the delaying optical fiber 1226 in the second optical fiber device 1206b, the first and second return optical signals are temporally delayed from one another when they arrive at the optical interrogator 1202. Such a configuration can thus allow independent measurements to be taken on the first and second sensing optical fibers 1220 and 1224 even when using an optical signal having a single optical pulse, for instance. Examples of such first and second return optical signals are shown in FIG. 12A.

Still referring to FIG. 12, the DTSS system 1200 has a controller 1230 which is communicatively coupled, via wired communication and/or wireless communication, to the optical interrogator 1202 for processing and/or storing data indicative of the received return optical signal(s). As can be understood, the controller 1230 can be provided as a combination of hardware and software components. The hardware components can be implemented in the form of a computing device 1300, an example of which is described with reference to FIG. 13 whereas the software components of the controller can be implemented in the form of a software application.

Figure 13:
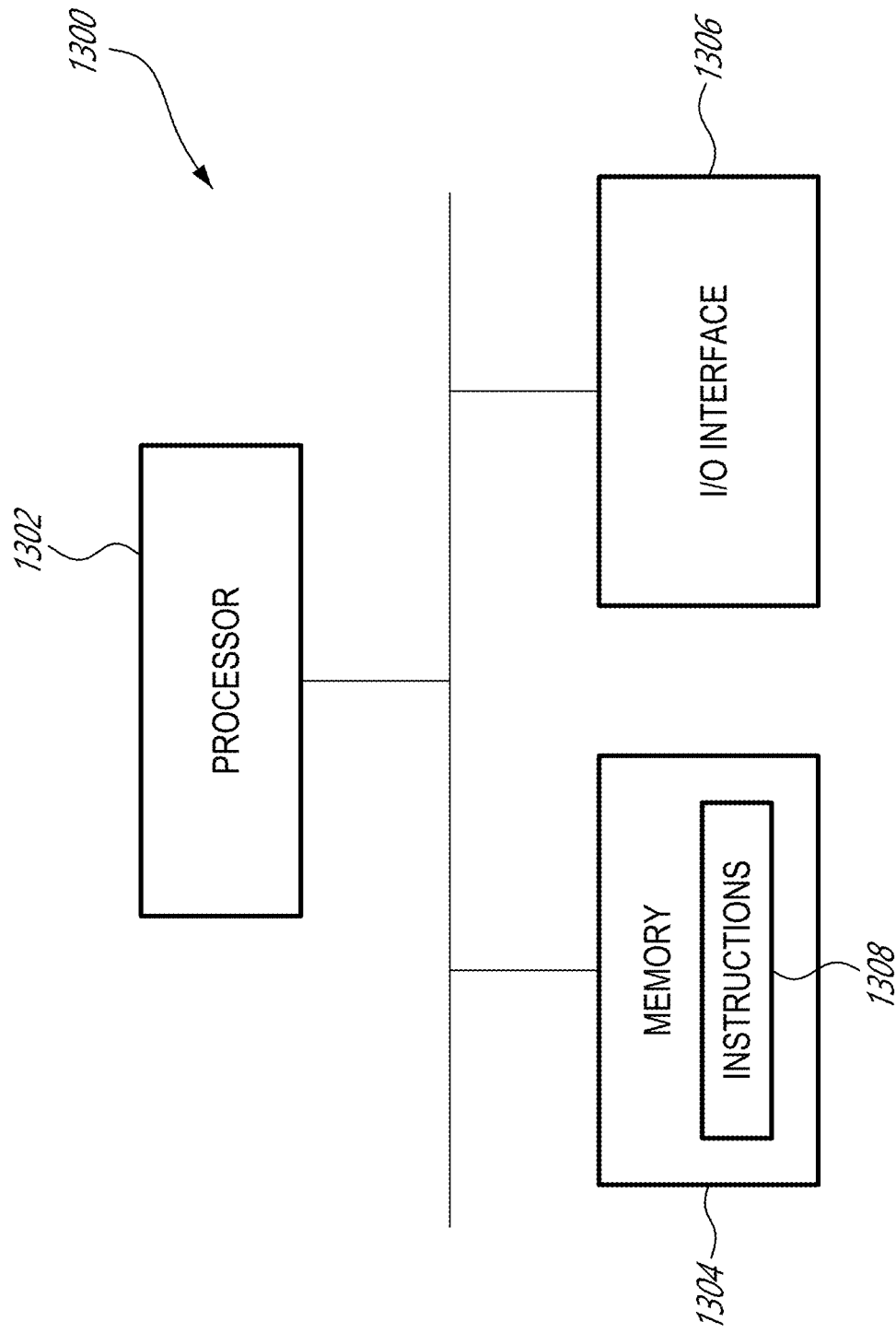
FIG. 13 is a schematic view of a computing device of the controller of the DTSS system of FIG. 12, in accordance with one or more embodiments.

Referring to FIG. 13, the computing device 1300 can have a processor 1302, a memory 1304, and I/O interface 1306. Instructions 1308 for performing the method to perform distributed strain and/or temperature measurements can be stored on the memory 1304 and accessible by the processor 1302.

The processor 1302 can be, for example, a general-purpose microprocessor or microcontroller, a digital signal processing (DSP) processor, an integrated circuit, a field programmable gate array (FPGA), a reconfigurable processor, a programmable read-only memory (PROM), or any combination thereof.

The memory 1304 can include a suitable combination of any type of computer-readable memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 1306 enables the computing device 1300 to interconnect with one or more input devices such as the optical interrogator 1202, a keyboard, a mouse and the like, or with one or more output devices such as a display, a memory and the like.

Each I/O interface 1306 enables the controller 1230 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WMAX), SS7 signaling network, fixed line, local area network, wide area network, and others, including any combination of these. Of course, the controller 1230 is optional as it can be omitted in certain embodiments. The computing device 18 of the shape sensing system 10 described with reference to FIG. 1 can be similar to the controller 1230 described with reference to FIGS. 12 and 13.

Referring back to FIG. 12, tt is noted that although the first optical fiber device 1206a is shown without a delaying optical fiber 1226, the first optical fiber device 1206a can have a delaying optical fiber connected between the first one of the outputs 1210 of the optical coupler assembly 1204 and the first sensing optical fiber 1220 in some other embodiments. In such embodiments, the optical path length of the delaying optical fiber of the second optical fiber device 1206b is chosen so as to be equal or greater than the length of the first optical fiber device 1206a, i.e., equal or greater than the length of the delaying optical fiber of the first optical fiber device 1206a and the first sensing optical fiber 1220 combined to one another.

Although the DTSS system 1200 described with reference to FIG. 12 has first and second optical fiber devices 1206a and 1206b, other embodiments can have more than two optical fiber devices. Such examples are presented with reference to FIGS. 14 and 15.

Figure 14:
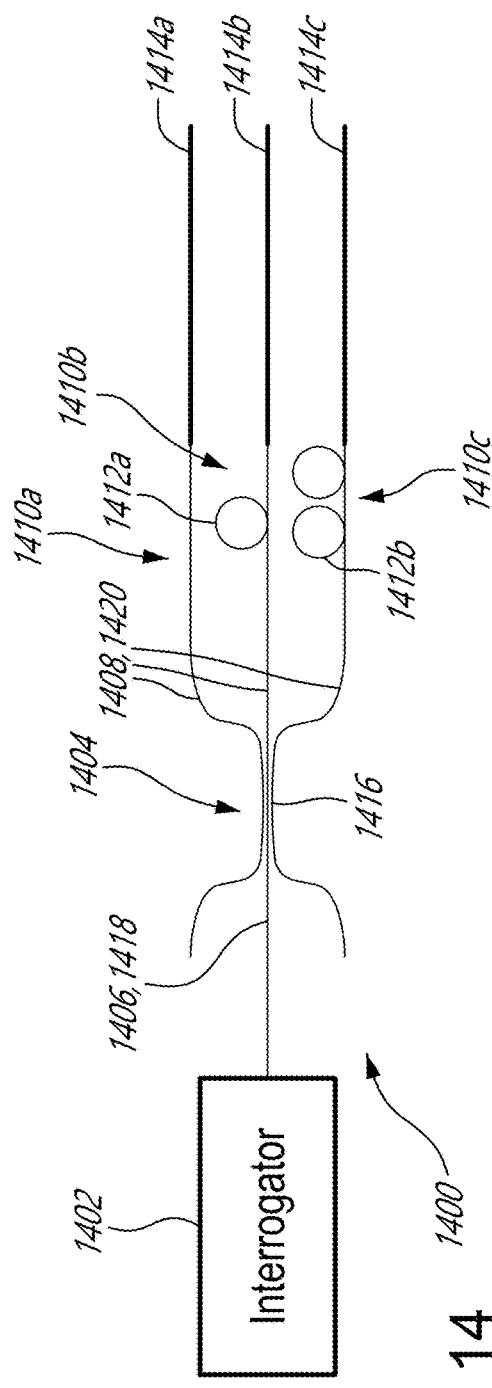
FIG. 14 is a schematic view of another example of a DTSS system, with three sensing optical fibers, in accordance with one or more embodiments.

FIG. 14 shows an example of a DTSS system 1400 having an optical interrogator 1402, an optical coupler 1404 having an optical fiber input 1406 connected to the optical interrogator 1402, and first, second and third optical fiber outputs 1408 to which are connected respective ones of first, second and third optical fiber devices 1410a, 1410b and 1410c. The first and second optical fiber devices 1410a and 1410b of this example are similar to the ones described with reference to FIG. 12. For clarity purposes, the delaying optical fiber of the second optical fiber device 1410b will be referred to as the first delaying optical fiber 1412a.

As shown, the third optical fiber device 1406c has a second delaying optical fiber 1412b which is serially connected to a third one of the optical fiber outputs 1410, wherein the second delaying optical fiber 1412b has an optical path length being equal to or greater than an optical path length of the second optical fiber device 1410b, including both the first delaying optical fiber 1412a and the second sensing optical fiber 1414b. As shown, a third sensing optical fiber 1414c is serially connected to the second delaying optical fiber 1412b. As such, during use, the optical interrogator 1402 is configured for receiving a third return signal returning from the third sensing fiber 1414c in a manner that the first return optical signal returning from the first optical fiber device 1410a, the second return optical signal returning from the second optical fiber device 1410b and the third return signal returning from the third optical fiber device 1410c are all temporally delayed from one another.

Also shown in this example, the optical coupler 1404 is provided in the form of a three-by-three fiber coupler 1416 having one optical fiber input 1418 and three optical fiber outputs 1420. In other embodiments, four-by-four fiber couplers, five-by-five fiber couplers and/or X-by-Y fiber couplers (where X and Y are positive integers) could alternately be used.

Figure 15:
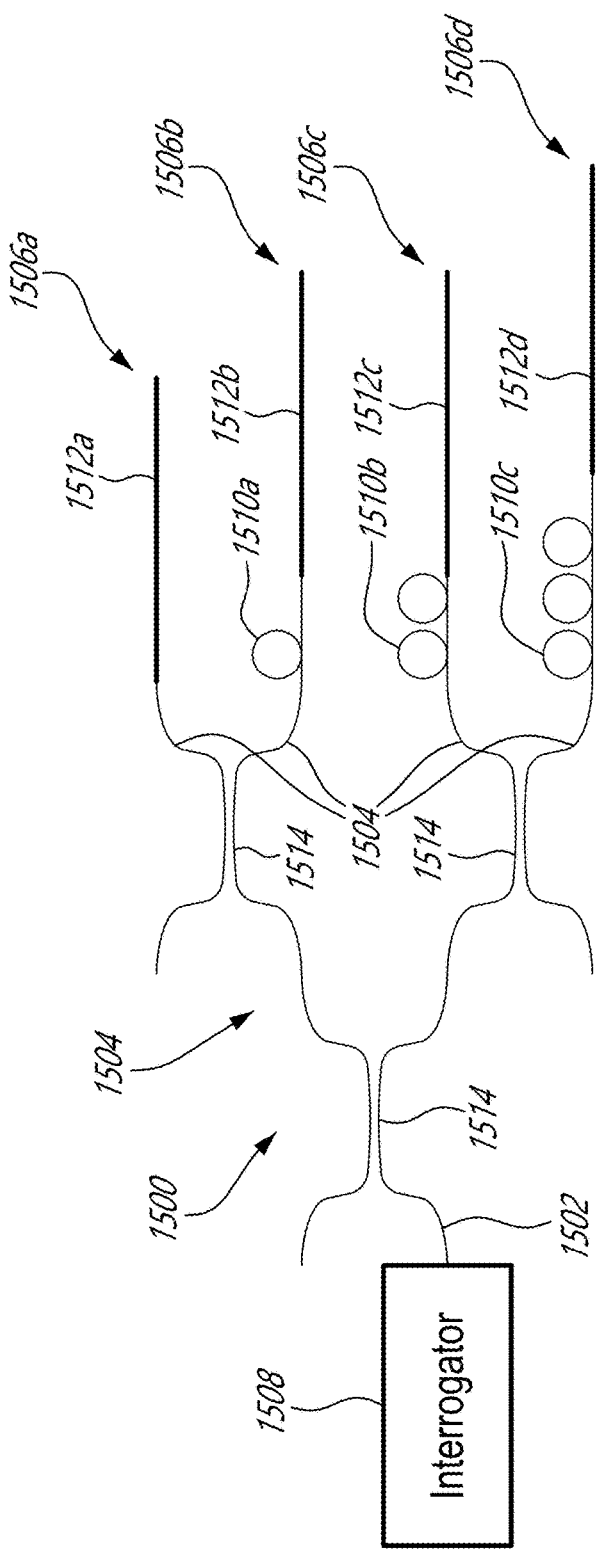
FIG. 15 is a schematic view of another example of a DTSS system, with four sensing optical fibers, in accordance with one or more embodiments.

FIG. 15 shows another example of a DTSS system 1500, in accordance with an embodiment. In this embodiment, the optical fiber coupler 1504 has one optical fiber input 1502 and four optical fiber outputs 1504. In this way, four different optical fiber devices 1506a, 1506b, 1506c and 1506d can be connected to respective ones of the optical fiber outputs 1504.

In this example, the DTSS system 1500 has an optical interrogator 1508, the optical coupler assembly 1504 having the optical fiber input 1502 connected to the optical interrogator 1508, and first, second, third and fourth optical fiber outputs 1504 to which are connected respective ones of first, second, third and fourth optical fiber devices 1506a, 1506b, 1506c and 1506d. The first, second and third optical fiber devices 1506a, 1506b and 1506c of this example are similar to the ones described with reference to FIG. 14.

Moreover, in this example, the fourth optical fiber device 1506d has a third delaying optical fiber 1510c which is serially connected to the fourth optical fiber outputs 1504 of the optical coupler assembly 1504. The third delaying optical fiber 1510c has an optical path length which is equal to or greater than an optical path length of the third optical fiber device 1506c, including both the second delaying optical fiber 1510b and the third optical sensing fiber 1512c. A fourth sensing optical fiber 1512d is provided in a serial connection to the third delaying optical fiber 1510c. As such, during use, the optical interrogator 1508 is configured for receiving a fourth return signal returning from the fourth sensing fiber 1512d. Accordingly, the first return optical signal returning from the first optical fiber device 1506a, the second return optical signal returning from the second optical fiber device 1506b, the third return signal returning from the third optical fiber device 1508c and the fourth return signal returning from the fourth optical fiber device 1506d are all temporally delayed from one another.

In this example, the optical coupler assembly 1504 has a cascade of two-by-two fiber couplers 1514 which are connected to one another to provide the four distinct optical fiber outputs 1504 to which the first, second, third and fourth optical fiber devices 1506a, 1506b, 1506c and 1506d are connected.

Of course, other exemplary DTSS systems based on the present disclosure can have more than four optical fiber devices connected to respective outputs of the optical coupler assembly.

Referring back to FIG. 12, the inventors found convenient to provide one or more scatter increasing devices 1232 along corresponding one(s) of the first and second optical fiber devices 1206a and 1206b. Indeed, by providing such devices, the strength of the first and second return signals can be increased, which in turn allow increased sensitivity. For instance, in the illustrated embodiment, the scatter increasing device 1232 of the second sensing optical fiber can help distinguish a portion (low signal) of the second return signal which returns from the delaying optical fiber 1226 from a portion (high signal) of the second return signal which returns from the second sensing optical fiber 1224. As such, the DTSS system 1200 can be configured to prevent interference between the low signal returning from the delaying optical fiber 1226 and the high signal returning from the second sensing optical fiber 1224.

To achieve such a difference in scattering, the material of the scatter increasing device can be different from the material of the delaying optical fiber 1226, as these material can have naturally different scattering properties. In such a case, a sensing optical fiber having a material which is different from a material of a delaying optical fiber 1226 can act as the scatter increasing device 1232.

An example of how such an increase in scatter can be provided includes different optical fibers with naturally different scattering. This can be changed, for example, by a choice of material and/or dopants (e.g., plastic versus silica, different dopants in silica), a choice of dopant concentration, a choice of quality as low quality optical fibers will have greater scattering properties and provide a higher signal compared to high quality optical fibers which will have lower scattering properties and provide lower signal, a choice of numerical aperture (NA) as an optical fiber having a higher NA will collect more back-scattering than an optical fiber having a lower NA, and/or any other suitable way to induce a change in scattering properties along between the delaying optical fiber and the sensing optical fiber. For instance, increased scatter optical fibers as made by Corning® can have including Titania particles in their core, which enhance light scatter significantly.

An example of how such an increase in scatter can be provided includes, but not limited to, by changing a concentration of defects along the device by UV exposure and/or or fs laser pulses, FBG inscription, random grating inscription, ROGUE FBG inscription, and the like. Enhanced optical fibers like the one described in Yan, Aidong, et al. ("Distributed Optical Fiber Sensors with Ultrafast Laser Enhanced Rayleigh Backscattering Profiles for Real-Time Monitoring of Solid Oxide Fuel Cell Operations." Scientific reports 7.1 (2017): 9360) could also be used as scatter increasing devices.

Figure 16:
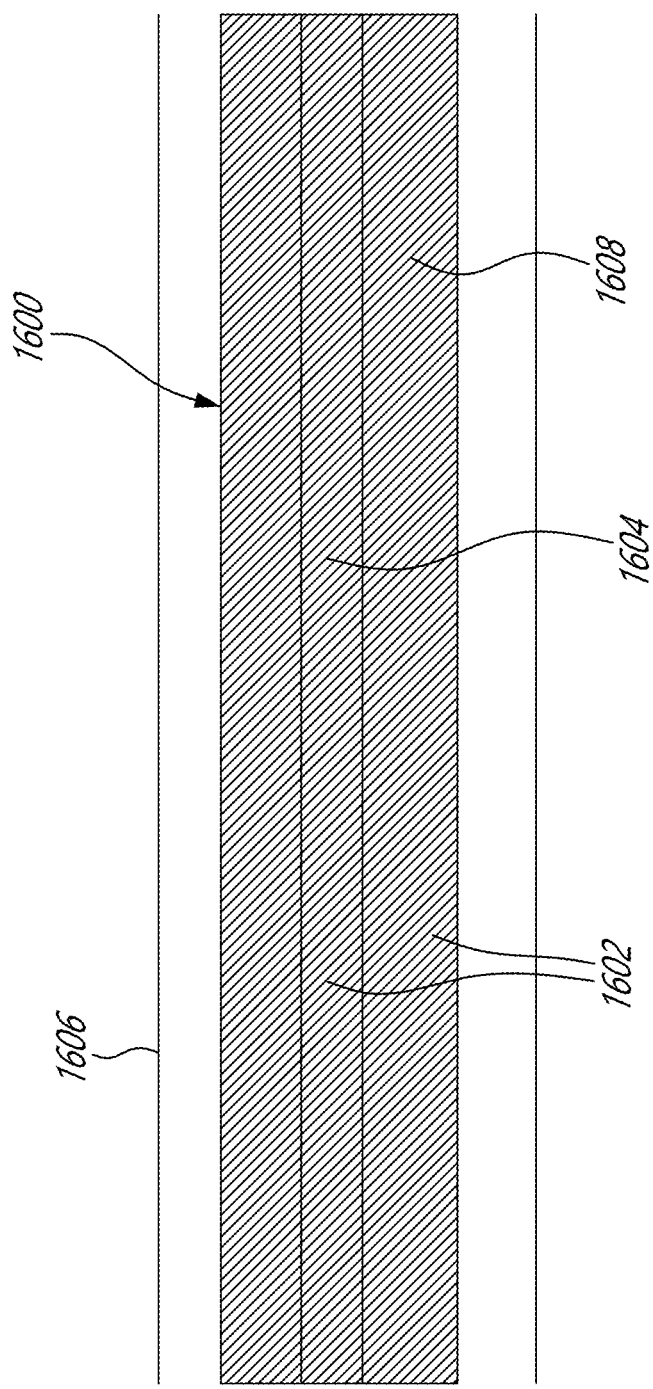
FIG. 16 is an enlarged view of a scatter increasing device of the DTSS system of FIG. 12, in accordance with one or more embodiments.

FIG. 16 shows an example of a scatter increasing device 1600 similar to one of the scatter increasing devices 1232 of FIG. 12. More specifically, the illustrated scatter increasing device 1600 is an optical grating 1602 inscribed along a portion of a corresponding core 1604 of a sensing optical fiber 1606. Reference numeral 1608 shows a cladding of the sensing optical fiber 1606. The inscribed optical grating 1602 has a random continuous distribution such that a return signal, caused by propagation of an optical signal thereal-ong, has a full width at half maximum (FWHM) bandwidth ranging between about 0.1 THz and about 40 THz. In some embodiments, the FWHM bandwidth can preferably range between about 0.35 THz and about 7 THz.

In some embodiments, the FWHM bandwidth can be related to a coherence length of the grating, and can be defined as the length where the visibility of fringes would drop to 1/e of its initial intensity if the coherent wave in the grating was to interfere with itself at another location. The coherence length is proportional to the inverse of the FWHM bandwidth of the return signal, depending on the spectral shape of the scatter. More specifically, the coherence length can be equivalent to the following equation:

$$L_c = \frac{C \cdot \lambda^2}{n \cdot \Delta \lambda}, \quad (1)$$

wherein $L_c$ denotes the coherence length, $\lambda$ denotes the wavelength of the optical signal propagating in the grating, C is dependent on the shape of the spectrum of the return signal, n denotes the refractive index of the optical fiber and $\Delta\lambda$ denotes the FWHM bandwidth.

Accordingly, in some embodiments, the grating can have a coherence length which ranges between about $2\lambda$ and about $500\lambda$ when the return signal has a scattering spectrum with a Gaussian shape. In some specific embodiments, the coherence length ranges between about $10\lambda$ and about $100\lambda$. This can correspond to a back-scattering FWHM bandwidth of about 1 nm to 500 nm (at a wavelength of 1550 nm) depending on the scattering spectral shape. In other words, the back-scattering structure is less coherent then a uniform FBG, but more coherent than a Rayleigh scatter structure. It was found that such gratings can cause return signals to have a FWHM bandwidth which is constant, provided that the grating has a length which exceeds a given length. In some embodiments, the given length is in the centimeter range. As shown, the scatter increasing device can be inscribed in the core of the sensing optical fiber but also in the cladding(s) of the sensing optical fiber.

In some embodiments, the random continuous distribution of the grating is a random phase distribution. In some embodiments, the random continuous distribution of the grating is a random period or wavelength distribution. In alternate embodiments, the random continuous distribution is a random amplitude distribution. In still further embodiments, the random continuous distribution can involve a random phase distribution, a random period distribution and/or a random amplitude distribution.

As will be described below, the optical grating, which is also referred to as a ROGUE FBG in this disclosure, has a length which is in the centimeter range. For instance, the length of the grating can be greater than 1 cm, and preferably greater than 2 cm. In some embodiments, the grating can be inscribed using an inscribing wavelength which is different from a wavelength of the optical signal which is meant to be propagated therein. However, in some other embodiments, the grating can be inscribed using an inscribing wavelength which corresponds to the wavelength of the optical signal which is meant to be propagated therein. For instance, using a point-by-point non-interferometric inscription technique with a fs pulsed laser, the inscription of the grating is independent of the inscribing wavelength, but rather only depends on a repetition rate of the pulsed fs laser and on its speed.

Example 2—Scatter Based Order of Magnitude Increase in Distributed Temperature and Strain Sensing by Simple UV Exposure of Optical Fiber An example is presented to improve signal strength, and therefore increase sensitivity in DTSS by Fourier domain scatter. A simple UV exposure of a hydrogen loaded standard SMF-28 fiber core is shown to enhance the back-scattered light dramatically by ten-fold, independent of the presence of a Bragg grating, and is therefore created by the UV exposure alone. This increase in back-scatter allows an order-of-magnitude increase in sensitivity for DTSS compared to un-exposed SMF-28 fiber used as a sensing element. This enhancement in sensitivity is effective for cm range or more sensor gauge length, below which is the theoretical cross-correlation limit. The detection of a 20 mK temperature rise with a spatial resolution of 2 cm is demonstrated. This gain in sensitivity for SMF-28 is compared with a high Ge doped photosensitive fiber with a characteristically high NA. For this latter, although of less amplitude, the UV enhancement is also present, and enables a yet even lower noise level of sensing, due to the fiber's intrinsically higher scatter signal.

DTSS systems are extremely useful for industrial monitoring, since they provide real-time information along a region of interest with low-cost optical fiber. Optical time domain reflectometry (OTDR) using scatter has been used for decades to investigate distributed information along a fiber. It has been demonstrated for DTSS in long lengths of fiber (~km), but with poor spatial resolution (~m) and very poor temperature sensitivity (~10° C.). On the other hand, it's Fourier Domain (OFDR) counterpart gives the highest spatial resolution in DTSS (~mm) while allowing a reasonable temperature sensitivity (0.1 to 1° C.) and remaining a rather simple and cheap scheme, compared to other DTSS schemes. However, Rayleigh scatter OFDR has remained quite limited in terms of sensing length (30-100 m). For this reason, other methods have been developed using Raman scattering (ROTDR), with allows much longer reach of 1-30 km, and Brillouin scattering (BOTDR or BOTDA), with even longer lengths of 10-100 km. Both of these techniques however show less sensitivity (~1° C.) and much poorer resolution (1-10 m). Combinations of technique have also been proposed: Rayleigh and Brillouin scattering, also known as Landau-Placzek ratio analysis, and Rayleigh with Raman scattering.

The main limitation in the sensitivity and accuracy of Rayleigh scattering DTSS comes from the low scattering signal at the detector. Higher scattering medium, such as liquids in hollow core fibers, polymer fibers with larger scattering cross-sections, or specially designed high scattering silica fibers doped with various impurities can be used to increase this signal, thus increase the sensitivity. However, such schemes are non-standard and therefore expensive to produce and to render compatible with available optical equipment. There is suggested a simple and affordable method to radically improve temperature and strain sensitivity by ten-fold through a dramatic increase in scatter in standard fiber. This increase comes from simply exposing the fiber core to UV light, which creates a high density of scattering defects, such as observed by Johlen et al. in their study of UV exposure induced losses. Such enhancement in fiber can be easily induced with any UV laser (solid state, argon) without any critical alignment or vibration control unlike when writing FBGs. The UV-exposure is also compared to UV writing of FBGs.

ODFR allows the measurement of a reflectivity pattern, such as Rayleigh scattering along a fiber length. The backscattering effects of Rayleigh are caused by defects causing a local variation in the permittivity. As described by Froggatt et al., such a permittivity can be measured with the knowledge of the spectral intensity of an interference between the fiber under test and a reference arm:

$$\Delta \bar{\varepsilon}(x) = i \frac{n}{E_0^2 r c \beta_0 \pi} \int_{-\Delta\beta}^{\Delta\beta} I_d(\beta - \beta_0) e^{-i\beta 2(x-x_0)} d\beta \quad (2)$$

Where $I_d$ is the measured spectral intensity of the interference, n is the refractive index, $E_0$ the input laser field, r the reflection coefficient of the reference beam and $x_0$ the position of the reference reflection. Considering that the system can have discrete sampling, the corresponding integral in Eq. (2), the reflected intensity vs position (therefore in the time domain), can be re-written as:

$$\tilde{I} = \frac{1}{N} \sum_{k=0}^{N-1} I_k e^{-ikm\frac{2\pi}{N}} \quad (3)$$

Where N is the total number of points within the measurement and $I_k$ is the spectral intensity at different point k along the scan. The measurement of temperature/strain is relative to a reference measurement. Both are compared by doing a cross-correlation over an integration length $\Delta x$, which is called the sensor gauge length and corresponds to the spatial resolution of the DTSS:

$$I_k^{(ref)} \otimes I_{N'-k}^{(test)*} = \frac{1}{2\pi N} \sum_{m=m_1}^{m_2} \tilde{I}_m^{(ref)} \tilde{I}_m^{(test)*} e^{ikm\frac{2\pi}{N'}} \quad (4)$$

Where N' corresponds to the number of points in the integration length $\Delta x$ (as $N'=m_2-m_1+1$), which is considered as the sensor length, or gauge length, and corresponds to the spatial resolution of the DTSS measurement. This cross-correlation is in the Fourier domain. When there is no strain or temperature change, a peak is expected at zero frequency. When a temperature or strain change is applied in the sensor gauge length, then this peak shifts proportional to the change. Therefore, the resulting frequency shift is a direct measurement of the observed change in temperature or strain and such a value can be calculated for every sensor gauge lengths $\Delta x$. It is desirable to minimise this length, since it defines the spatial resolution. However, the longer the sensor length, the higher the peak intensity in the cross-correlation, giving a higher signal to noise ratio (SNR). The noise itself is intrinsic to the calculation and the nature of Rayleigh scattering, i.e. the random fluctuation in $\Delta \bar{\varepsilon}(x)$, therefore is always present. This being said, the longer the gauge length, the more precisely can the frequency shift be determined, thus improving the precision of the temperature or strain measurement. The link between frequency shift and strain or temperature is determined by a calibration constant within the OFDR system. It can be shown that such a physical uncertainty limit can be express as follows:

$$\Delta x \varepsilon_{res} = \frac{\lambda}{4n} \quad (5)$$

$$\Delta x T_{res} = \frac{\lambda}{4n} \left(\frac{d\varepsilon}{dT}\right)^{-1}$$

Where $\varepsilon_{res}$ is the strain resolution (dimension-less) and $T_{res}$ is the temperature resolution. This theoretical limit can be easily observed in the results of FIGS. 17A-C for small gauge lengths. However, at longer lengths of $\Delta x$ (1 cm or more), another limit appears: the detector intensity noise (not taken into account in Eq. (5)) and the temperature fluctuation along the gauge length.

To improve these limits, there is presented that a simple UV exposure on the fiber, such that a very weak out of band reflection grating is written has the effect of increasing the scattering emission and collection by ten-fold, thus generating an increase in sensitivity. UV exposure of hydrogen (or deuterium) loaded SMF-28, as well as on high germanium content core fiber has the effect of creating colour centers. However, why such exposure would increase scatter, which normally comes from defects in a fiber, is still under investigation. However, the presence of the weak grating away from the wavelength of measurement improves the scatter signal dramatically. An increase in back-scattering collection can also be accounted for by an increase in the NA of the fiber. However, this increase in collected back-scattered power is expected to be limited to a factor of <2, for the expected refractive index change, below $10^{-3}$ in our demonstration.

Two types of fibers were tested: a standard SMF-28 single-mode telecom fiber by Corning which was hydrogen loaded for increased photosensitivity and a high NA (0.27) photosensitive fiber with high Ge content from CoreActive (uvs-eps), referred to as HNA in this example. in the latter fiber, exposure was made by continuously exposing the fiber with UV light, while with the SMF-28, two types of FBGs were tested and compared with the continuously UV exposed fiber: a uniform grating and a random grating with randomly positioned phase shifts. FBGs were measured out-of-band for DTSS, to not be limited by the grating's bandwidth. Although the FBGs is expected to offer more back-scattering than simple UV exposure since there is more refractive index variation within the fiber, surprisingly, results show that this is not the case, as can be seen in 7B. Indeed, a continuous UV exposure generates a 20 dB intensity increase in back-scattering return signal, which corresponds to a ten-fold increase in local losses, when taking into account the round-trip nature of the measurement which squares those local losses. Back scattering in the presence of the grating, uniform or random, also increases by the same order of magnitude. Although a more complex structure (oscillations) is observed when a random grating is involved, it was noted that this did not lead to any gain in strain or temperature sensitivity. Indeed, whether a grating is present or not, the average exposure is the same, and an identical gain was observed in terms of distributed temperature or strain noise. However, it is suspected that there may be a small contribution from the presence of the FBG, although this would require further investigation.

Figures 17A, 17B, 17C:
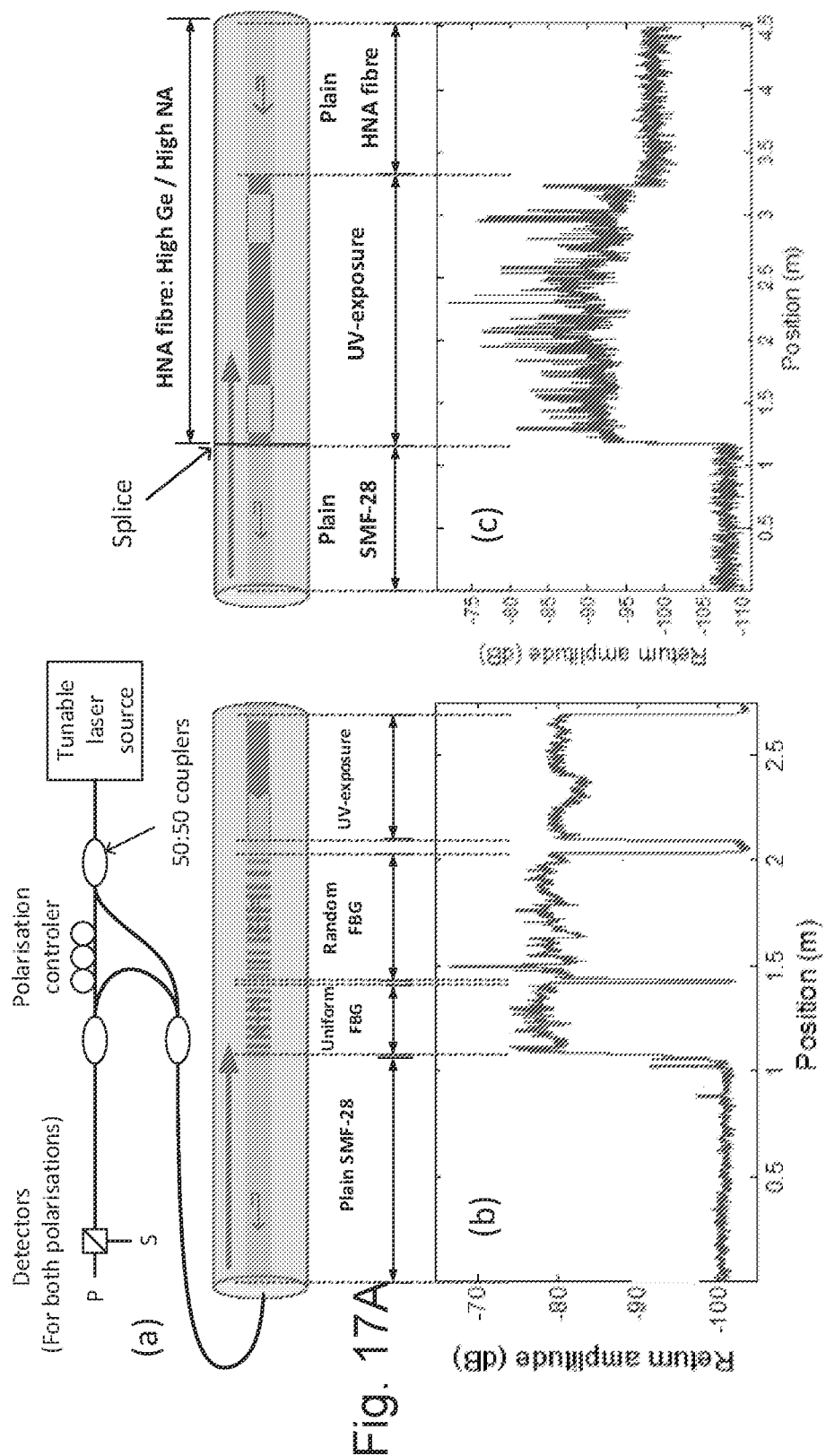
FIG. 17A is a schematic view of another example of a DTSS system, with a LUNA system configured for taking measurements (e.g., a 42-nm wide scan) in a sensing optical fiber, in accordance with one or more embodiments.
FIG. 17B is a graph showing return optical signal as function of position as taken with the LUNA system of FIG. 17A for a sensing optical fiber including i) a standard SMF-28 region, ii) a uniform fiber Bragg grating (FBG) region, iii) a random FBG and iv) continuous UV exposure region with no FBG.
FIG. 17C is a graph showing return optical signal as function of position as taken with the LUNA system of FIG. 17A for a sensing optical fiber including i) a standard SMF-28 region, ii) a UV-exposed portion of a high numerical aperture/high Germanium-doped core (hereinafter "HNA/high Ge core") optical fiber, and iii) a plain portion of the HNA/high Ge core optical fiber.

The UV-exposed HNA fiber shows the same improvement in scatter signal, compared to SMF-28, as can be seen in FIG. 17A. However, when comparing the effect of the exposure itself, i.e. the difference in signal between non-exposed HNA and exposed HNA fiber, the gain is not as great since this fiber already has a rather high Rayleigh signature (~ three times that of SMF-28) before exposition. This signature can be due to its fabrication inducing more defects as well as from its higher NA, which allows more collection of the back-scatter. Nevertheless, as seen in FIG. 18B, this UV-exposed fiber exhibits a DTSS noise level even more advantageous than UV-exposed SMF-28.

Figure 18:
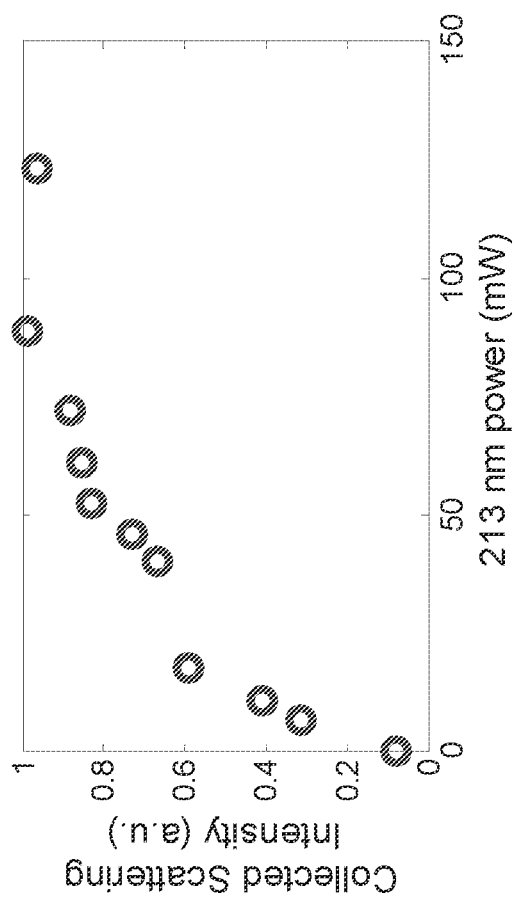
FIG. 18 is a graph showing collected scattering intensity as function of power at 213 nm for a sensing optical fiber, showing an increase in collected scatter intensity with UV exposure power at constant speed of exposure.

The gain in back-scattered signal gives rise to a considerable increase in temperature and strain sensitivity. Indeed, with this improvement in signal to noise ratio, the cross-correlation of Eq. (4) yields a more precise frequency shift, thus a higher sensitivity in temperature or strain measurement. Note that these measurements are in temperature, but the same picture can be applied to strain with a factor of 8.32με/°C. (calibration factor for silica fiber from the LUNA system). The collected back-scatter was measured with varying UV exposure power, as shown in FIG. 18, to understand the optimal exposure to minimise requirements and maximise gain in sensitivity. As can be seen, after a rather linear increase, the gain saturates at around a ten-fold increase. Our choice of power and exposure time for DTSS tests were based on the best exposure conditions. The mechanics of such increase and saturation are still under investigation.

Figure 19:
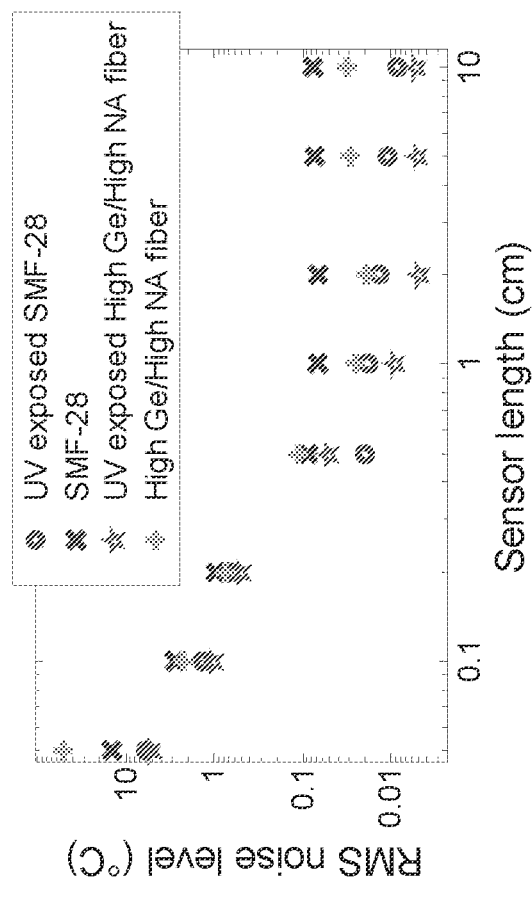
FIG. 19 is a graph showing root mean square (RMS) noise level as function of a length for a UV-exposed SMF-28, an unexposed SMF-28, a UV-exposed HNA/High Ge core, and an unexposed HNA/High Ge core.

A quantitative analysis is shown in FIG. 19 where the RMS noise level was calculated based on a 30 cm section of 1 mm spaced points. The sensor cross-correlation integration length, which defines the spatial resolution of the DTSS, was varied from a long length of 10 cm to a very short length of 1 mm. The limit defined by Eq. (5) can be observed in these results for short sensor lengths. The higher SNR of the UV exposed fiber seems to slightly improve the resolution within this range, where noise is limited by the cross-correlation on a random structure, typical of scatter. The most important gain is in the cm range, where the detection noise, unrelated to backscattering from the material structure and defects, becomes the dominating limitation. In this same range, the noise level can be expected to rise slightly as the sensor length increases, since it becomes more sensitive to thermal fluctuation along its length. However, the sensing fiber tested here was in a thermally stable isolated container, which explains why the thermal noise is more stable and actually decreases slightly with sensor length. This shows the performance limit of the DTSS system itself, independent of the environment. From these results in 9, there is showed a RMS noise level of 10-15 mK in temperature for gauge lengths of 2 cm or more for UV-exposed SMF-28. If converted to strain, this gives a RMS noise level of 80-120 nε. The UV-exposed HNA fiber's performance is twice as good compared to the SMF-28 with an RMS noise level of ~5 mK (40 nε), the best performance to date with this resolution level.

Figure 20A:
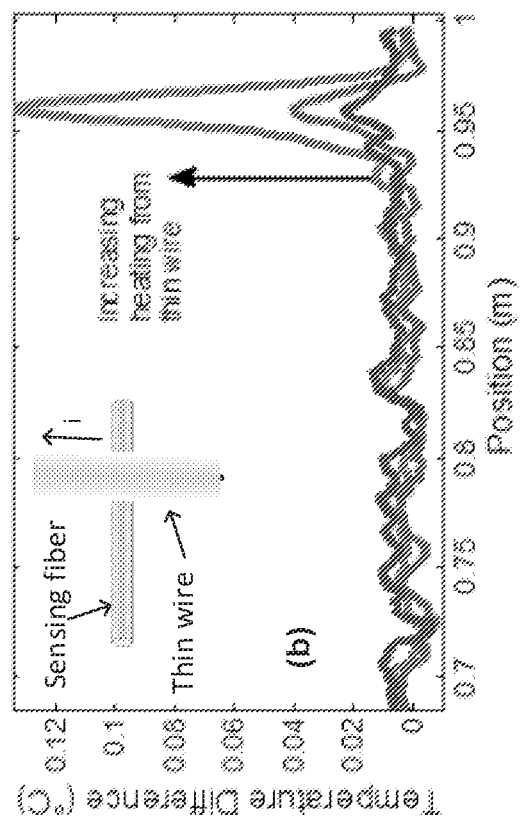
FIG. 20A is a graph showing temperature change as function of position for a sensing optical fiber maintained at constant temperature.
Figure 20B:
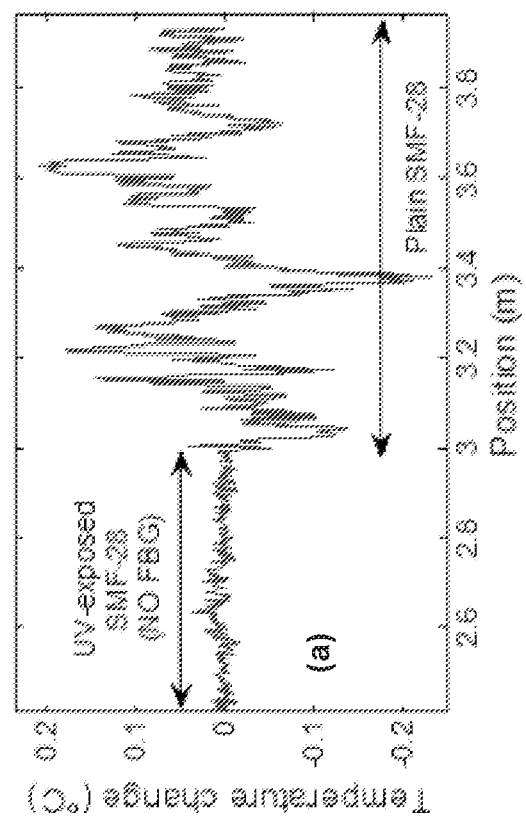
FIG. 20B is a graph showing temperature change as function of position for a sensing optical fiber being locally heated by a thin wire.

The difference in noise and ease of measurement can be appreciated in FIG. 10A, where we can see the improvement in the measurement along the fiber, which is placed in an isothermal, stable and isolated container. Another measurement example is shown in FIG. 9B where the resolution and sensitivity can be appreciated. In this case, a thin 0.2 mm diameter wire heated by a low current of 20 to 100 mA is placed in contact with a fiber (UV-exposed SMF-28) in a perpendicular fashion. With a 2 cm sensor integration length, the point-spread-function of such a DTSS measurement may be observed. The heating by 20 mK may be seen in the bottom curve in FIGS. 20A and 20B. To further increase the resolution and measurement quality, a spatial averaging was performed on surrounding points. The equivalent length of this spatial averaging was chosen as half the sensor integration gauge length so as to not further limit the spatial resolution.

While it has been nominally noted in the past that UV exposure increases back scatter in optical fiber, there has been no systematic study to either understand it or to apply it. In this example, we have undertaken to find the conditions to maximise scatter through UV radiation and also with the writing of weak off-band Bragg gratings, and then to use the increase in what we believe is the first application in sensing. We have shown here that a simple continuous UV exposure of a hydrogen loaded SMF-28, increases the back-scattered intensity by ten-fold, thus allowing a ten-fold increase in DTSS sensitivity. Increase in the collected back-scatter from a gain in the NA of the fiber can account for a factor of only 2 for the exposure used here, therefore the remaining back-scatter signal gain comes from an increase in scatter itself. The reason for this increase is still under investigation. However, with the presence of a weak off-band Bragg grating in the optical fiber, the scatter increases dramatically due to the nature of side modes of the grating. The increase in the signal, greatly improves the SNR at the detector, therefore pushing down the noise floor in DTSS measurements to the theoretical sensitivity/spatial resolution limit. Indeed, for a sensor integration length of 2 to 10 cm, a RMS noise level of 10 mK or 80 nε was obtained in a thermally stable environment in standard UV exposed H2 loaded fiber, after the removal of the hydrogen. An even lower noise floor was shown with a high NA photosensitive fiber to 5 mK or 40 nε, the best reported performance, to our knowledge, for a 1-2 cm range gauge length. In comparison, Gifford et al. demonstrated recently a 1 mK resolution, but with a 12 cm gauge length using weak semi-continuous FBG to increase return signal. However, when using Bragg gratings in-band, one is limited by the band-width of the grating, thus limiting the spatial resolution. Since UV-exposure affects the entire spectrum of scatter, our method of improvement does not involve any theoretical bandwidth limit, except equipment limitation from the scan range and practical consideration of measurement time.

With a saturating exposure in standard fiber, we can expect to further push back this limit to 5 mK noise level for a 2 cm sensor and perhaps 1 mK for a 10 cm spatial resolution, although at this stage, applications are limited to a very stable environment. Improving back-scatter is very simple, since it only requires a UV laser and a focusing element. No critical alignment or vibration stabilization is required. Although we used hydrogen loaded SMF-28 in our demonstration, the same effect was shown in photosensitive fiber exhibiting a similar UV interaction mechanism, i.e. color center generation, such as highly doped germanium fiber. Therefore, UV exposure can be performed easily during the drawing process in such a photosensitive fiber before the coating phase. It is also a much easier technique to improve sensitivity than writing multiple gratings along the sensing fiber, which does increase sensitivity, while sacrificing spatial resolution and increased fabrication costs.

Continuous UV exposure was performed using our high precision FBG writing system without writing and with writing a weak off-band FBG. The fiber core was illuminated with 213 nm wavelength from the $5^{th}$ harmonic of a 1064 nm solid-state laser (from Xiton Photonics GmbH). For DTSS tests, the fiber was exposed with 50 mW of power at 50 μm per second with a spot size of ~200 μm giving a uniform exposure time of ~4 seconds. Continuous UV exposure was compared to an out of band OFDR signature of FBGs written with the same exposure time and power, by a direct holographic writing technique using the same experimental setup. For scattering characterisation tests with exposure, power or speed was varied along a length of 100 mm. DTSS was performed using a commercial OFDR system from LUNA. Cross-correlation to resolve the frequency shift was also performed by the same commercial system. The sensing fiber was placed in a thermally stable environment (insulated box) to eliminate thermal fluctuations to provide a real sense of the measurement's noise limits. The long gratings were interrogated out-of-band to allow maximum penetration of the input light and to ensure a maximum sweeping range of the OFDR system. In such a case, it is not the grating resonance that is used, but the microscopic index variation due to the periodic nature of the refractive index modulation and which generate enhanced back-scatter. In order to ensure there is no contribution to the scatter measurements from the molecular hydrogen in the fiber, all measurements were in the following weeks after the UV exposure to allow the hydrogen to diffuse out at room temperature.

Example 3—Method of Inscribing an Optical Grating

Figure 21:
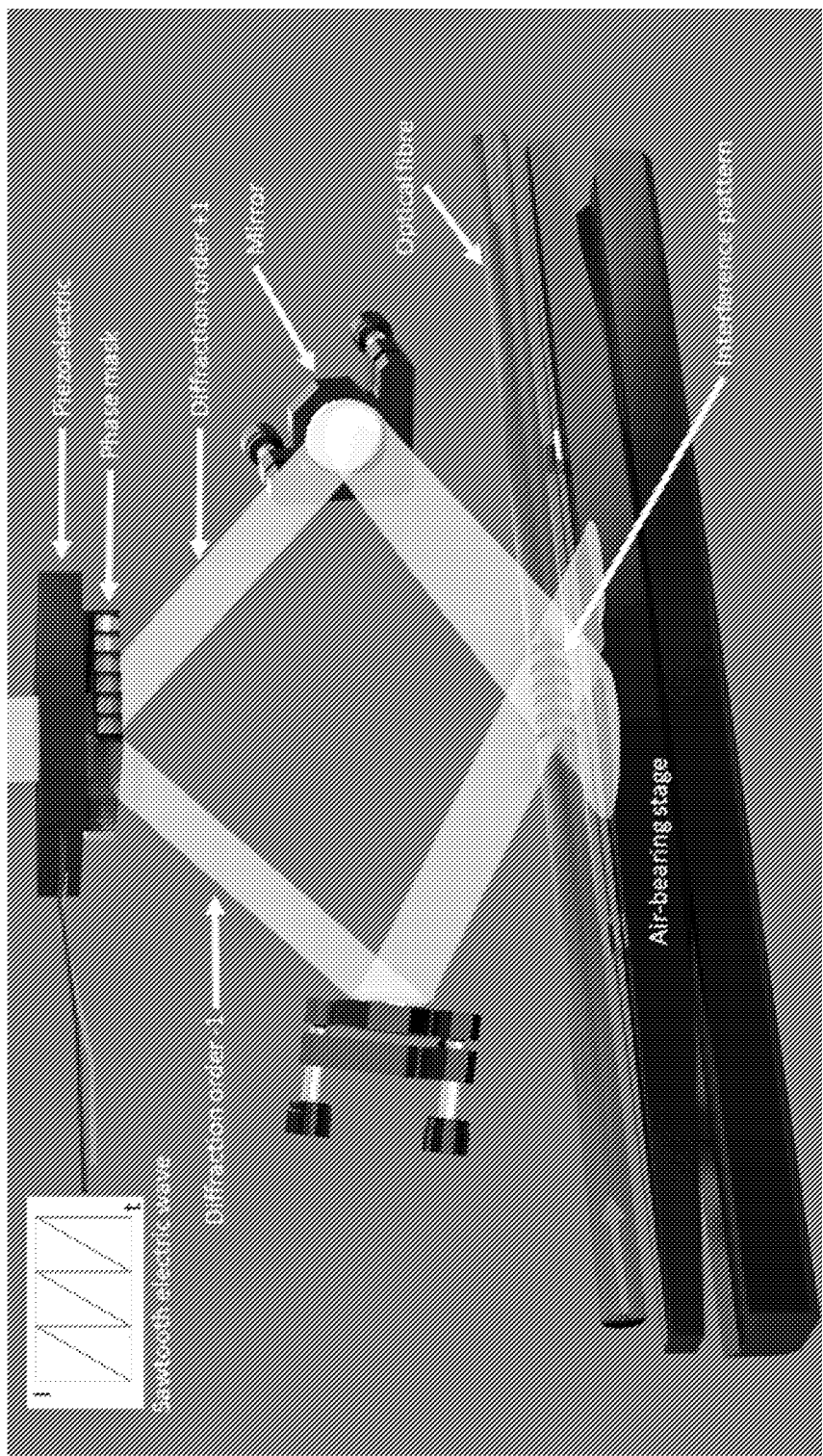
FIG. 21 is a schematic view of an example of a system for inscribing a FBG along an optical fiber using a phase mask and a Talbot interferometer, in accordance with one or more embodiments.

The ROGUE FBG was written in the fiber using a Talbot interferometer based FBG writing station. The fiber core was exposed to a 213 nm wavelength laser, using the $5^{th}$ harmonic of a 1064 nm laser. FIG. 21 presents this setup. The first two orders (+1 and −1) are reflected by mirrors onto the fiber, where an interference pattern is created. This interference pattern consists of very small regions on the fiber where the UV power is high, followed by regions where the UV power is low, in a periodic fashion. The UV exposure increases the refractive index locally, creating an FBG. By changing the angle of the mirrors, the interference pattern step (and thus the FBG wavelength) can be modified.

When writing a long FBG, the fiber is moved continuously under the phase mask. In order to preserve the interference pattern on the fiber, a sawtooth electric wave is applied to a piezoelectric element moving the phase mask at the same rate as the fiber, and then bringing it back after a certain movement amplitude. If the sawtooth frequency and amplitude match the FBG period and fiber moving speed, the interference fringes will overlap and a continuous, very high quality FBG will be written in the fiber. If the sawtooth wave does not have the right frequency or amplitude, the interference pattern will erase itself, since the entire length of the fiber will be exposed to the UV light, instead of specific interference fringes. However, the UV exposure is not completely uniform because of noise in the system, and a random interference pattern will appear in the fiber, leading to reflectivity over many different wavelengths. This reflectivity pattern is similar to having a very weak, very broadband Bragg grating all along the entire length of the fiber. However, it can be easily modeled as a multitude of very small, randomly placed gratings, so that the ROGUE FBGs bandwidth will stay the same as its length increases, contrary to a uniform Bragg grating, whose bandwidth decreases as the length is increased.

In order to increase the reflectivity of the ROGUE FBG, all that is needed is to increase the noise and slow down the rate of movement of the fiber. In order to do so, we simply replace the sawtooth wave by a random electric signal. This way, we are not dependent on the noise in the system but can generate the noise ourselves, increasing the backscattered signal by orders of magnitude.

Figure 22:
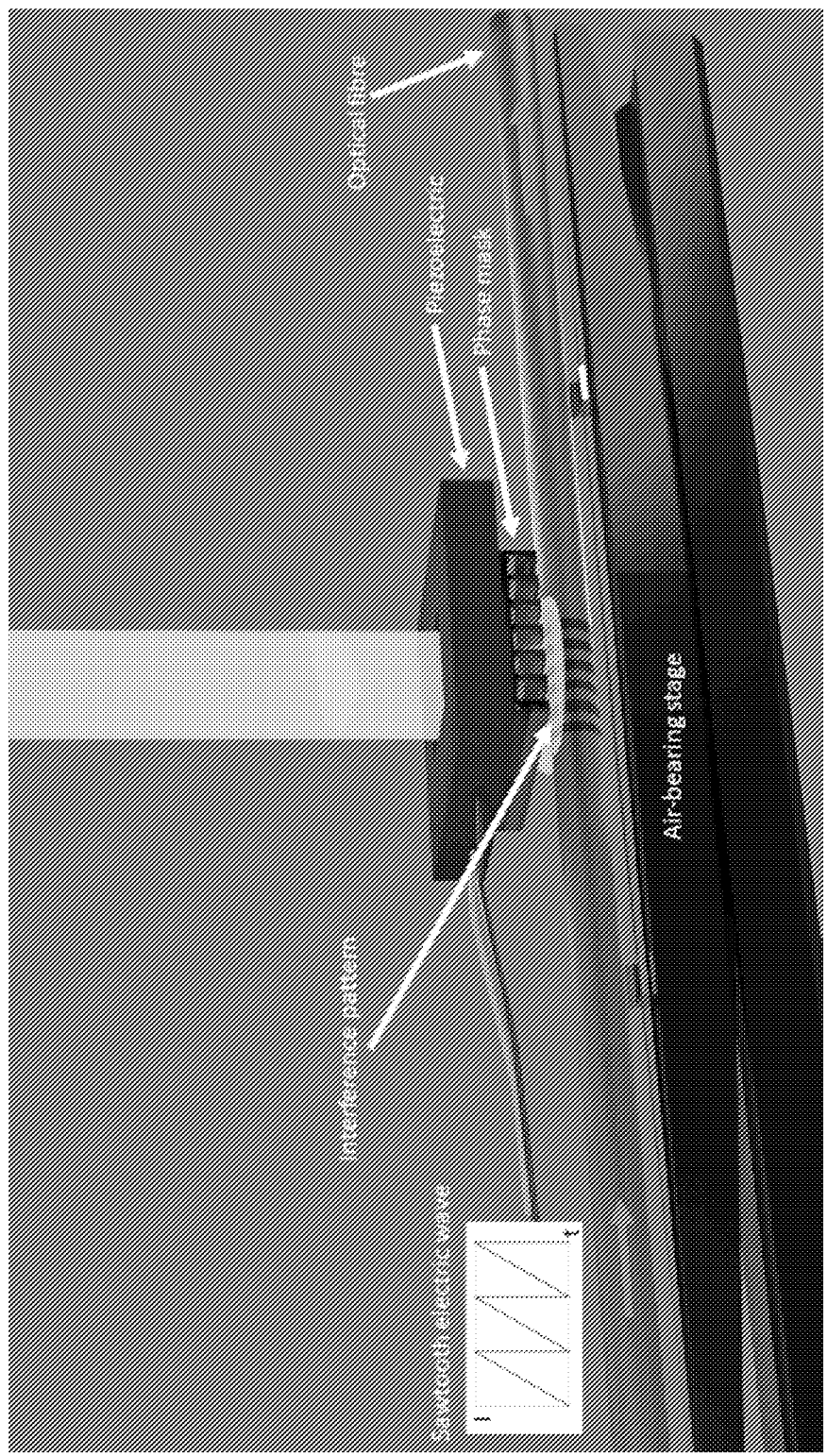
FIG. 22 is a schematic view of an example of a system for inscribing a FBG along an optical fiber using a phase mask, in accordance with one or more embodiments.

Another way to make such a ROGUE FBG would be to place the phase mask close to the surface of the fiber, instead of having a Talbot interferometer configuration, as shown in FIG. 22. The diffraction orders +1 and −1 directly interfere and form a near-field fringe pattern on the optical fiber, generating an FBG. The disadvantage of this technique is that the FBG central wavelength cannot be changed, unless the phase mask is moved as in the case of the Talbot scheme with a piezoelectric element. The wavelength can be changed by the speed of the fiber relative to the movement of the piezo. However, a ROGUE FBG can be written in a similar way as with the Talbot interferometer, by moving the fiber and applying a random electric signal on the piezoelectric.

Two different optical fibers were studied: standard SMF-28 optical fiber from Corning, the most widely used fiber in telecommunications, and a SM1500 highly Germanium doped fiber from FiberCore, an intrinsically photosensitive fiber with more than 5 times more Germanium than standard optical fibers. Both fibers were loaded with molecular hydrogen in order to increase photosensitivity.

Figures 23A, 23B:
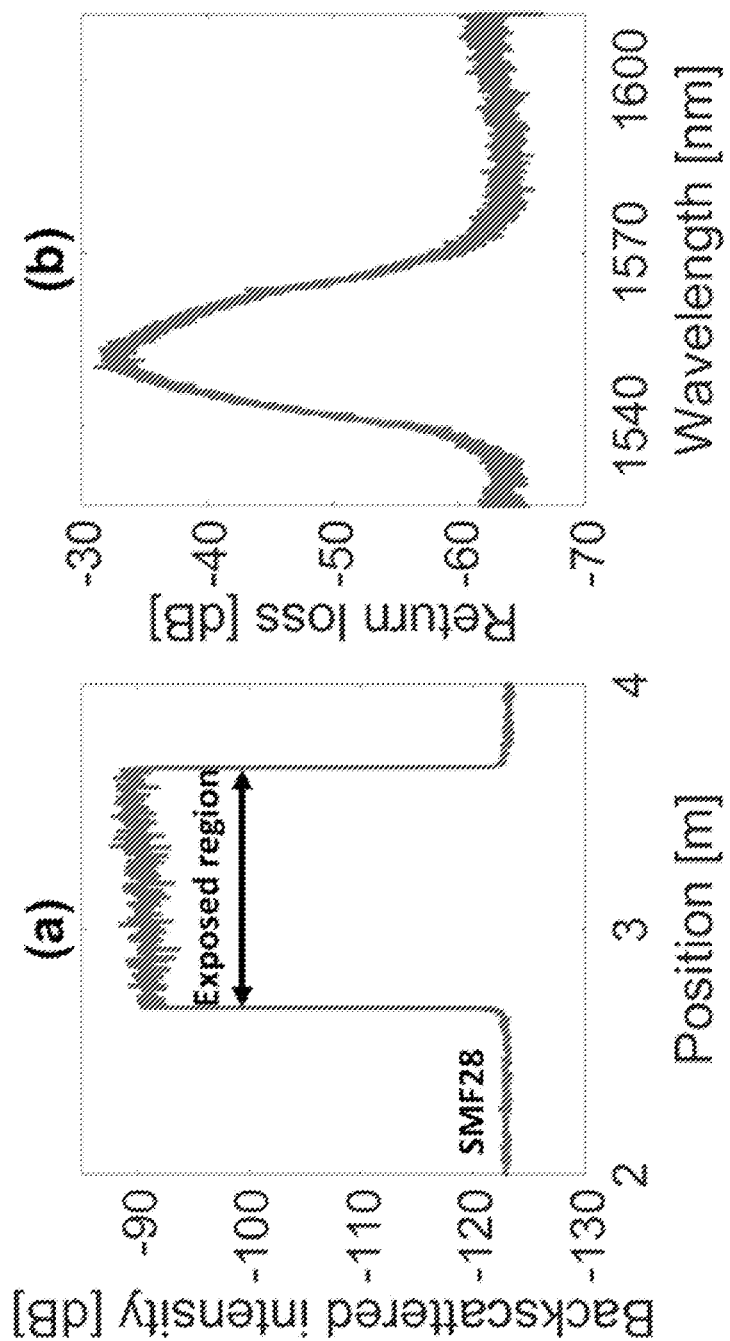
FIG. 23A is a graph showing backscattered intensity as function of position for a FBG inscribed in SMF-28 fiber using the system of FIG. 21, with 37 mW of laser power, at a writing speed of 0.2 mm/s, the measurements were taken with an 88.24 nm bandwidth on an OBR 4600.
FIG. 23B is a graph showing return loss as function of wavelength for the FBG of FIG. 23A.

Using the setup explained in the previous section, we wrote ROGUE FBGs with a backscatter intensity ranging from under 5 to over 50 dB above standard SMF-28. FIG. 23 show the results of such a ROGUE FBG in both, the temporal and spectral domains, written in SMF-28 fiber. A 45 dB increase in backscattered amplitude can be observed over the signal level of the unexposed fiber in the ROGUE FBG in the temporal domain in FIG. 23A. The reflection spectrum of the ROGUE FBG is shown in FIG. 23B. Its impressive spectral width (48 nm full width, 7 nm full width at half maximum) generates an important increase in signal over a very wide range of wavelengths.

Figure 24:
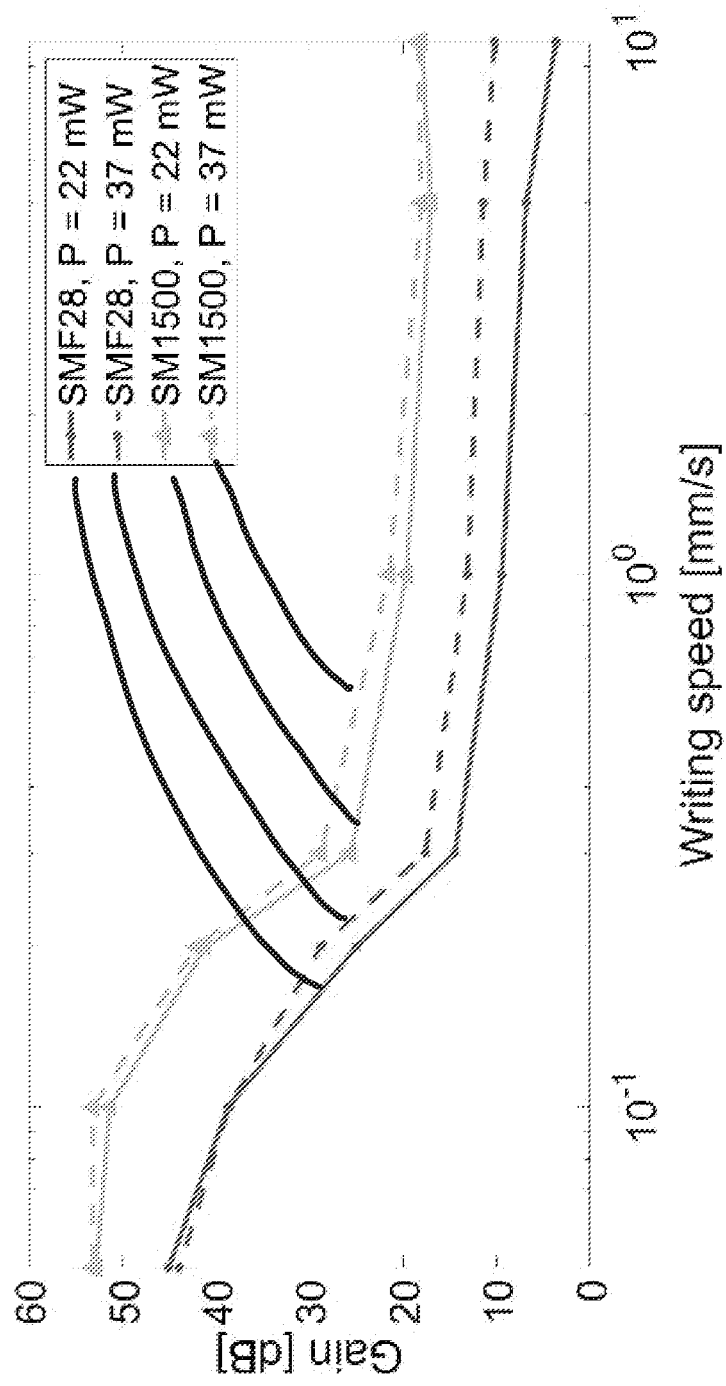
FIG. 24 is a graph showing gain as function of writing speed for a FBG inscribed using the system of FIG. 21 in a SMF-28 fiber from Corning and a SM1500 fiber from FiberCore using an amplitude of 5 V and a frequency of 20 Hz, with 22 mW and 37 mW of laser power.

By modifying the random signal amplitude and frequency applied to the piezoelectric element, the ROGUE FBG writing speed and the laser power, the strength of the ROGUE FBG can be modified and optimized. From our experiments, an amplitude of 5 V (the maximum that could be applied to our piezoelectric unit, corresponding to about 10 periods) and a frequency of 20 Hz yielded the best results. For higher frequencies, the ROGUE FBG amplitude decreases, most likely because the piezoelectric element cannot follow the random signal that is applied to it, thus reducing the effective amplitude of its movement. The writing speed and power were found to influence the strength of the ROGUE FBG significantly, as shown in FIG. 24. In this figure, 0 dB corresponds to the signal level of unexposed SMF-28 fiber. Measurements were made on the OBR 4600 using a 21.16 nm scanning bandwidth. The scanning bandwidth we established was best for sensing (as will be shown in the next sections).

Figure 25:
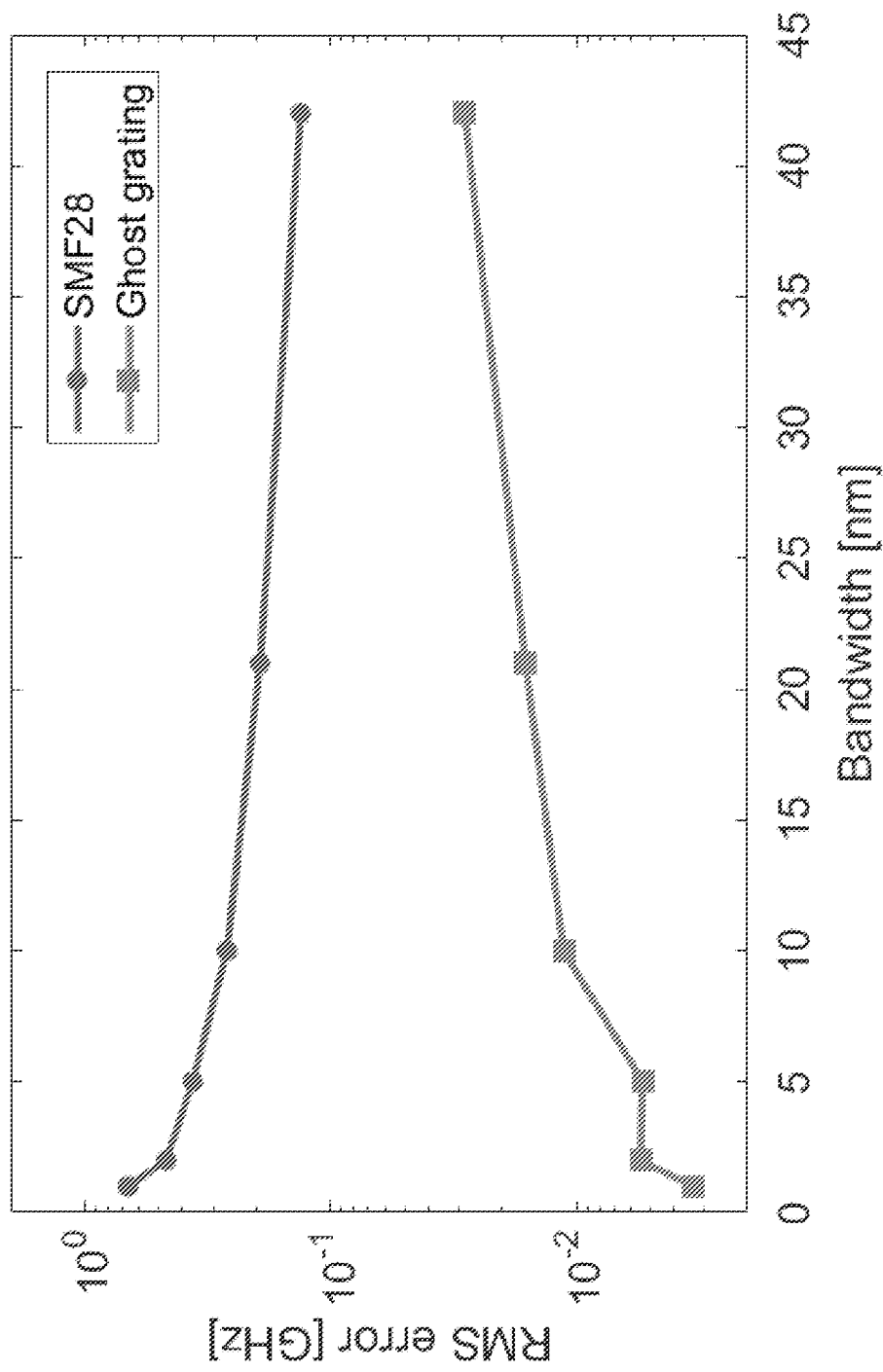
FIG. 25 is a graph showing RMS as function of bandwidth for 80 cm of unexposed SMF-28 fiber and for over 30 cm of a Random Optical Grating by Ultraviolet Exposure fiber Bragg grating (hereinafter referred to as "ROGUE FBG") inscribed using the system of FIG. 21 when maintained at constant temperature and averaged over 15 measurements.

The noise levels of both, standard, unexposed SMF-28 fiber and the ROGUE FBGs were measured by placing the fiber inside an insulated box, in order to avoid environmentally induced perturbations, such as air currents. In order to avoid problems related to the OBR's dynamic range, two different fibers were used, one in which a ROGUE FBG was inscribed, and another one that was left untreated. Indeed, during our experimentations, we realized that the inscription of a ROGUE FBG over one part of the fiber influenced the measurements on the rest of the fiber. For both fibers, a 30 cm sensing range was selected, and the spectral shift was calculated at every 1 mm along this sensing range with a 1 cm gauge length, leading to 300 sensor points per fiber. FIG. 25 presents the results of the root mean square (RMS) error of both fibers, calculated over all sensor points in the selected part of the fiber, and averaged over 15 measurements. In FIG. 25, results directly taken from the OBR are compared to the results after adding a correction to the OBR data treatment (the nature of the correction is beyond the scope of this report). All measurements relate to the sensing of strain or temperature variations and are measured in GHz. For SMF-28, 1 GHz corresponds to a variation of temperature of $0.801°$ C. or to a strain variation of $6.668\mu\varepsilon$ (a stretching or compression of $6.668 \times 10^{-4}$%).

From FIG. 25, it can be observed that, for the unexposed fiber, the RMS error decreases when the bandwidth is increased. That is to be expected, since an increase in bandwidth leads to a higher signal to noise ratio (SNR) However, surprisingly, the opposite happens in the case of the ROGUE FBG. That is most likely due to the fact that, contrary to the unexposed fiber, most of the signal comes from a very narrow spectrum. As such, the SNR actually increases when the scanning bandwidth is smaller, because only the portion of the spectrum of the ROGUE FBG is probed during the laser scan.

In order to characterize the accuracy of our sensors, we slowly stretched a 1.15 m fiber in increments of 1 μm using our nanometer precision stage (air bearing stage from Aerotech), and compared the strain measured by the sensor to the calculated value. All the scanning bandwidths offered by the OBR were tested, and both, the ROGUE FBG and the unexposed SMF-28 fiber were compared with the calculated values. Again, two different fibers (one in which a grating was inscribed, the other without) were tested separately, so that the grating did not influence the measurement on the unexposed fiber. The results are shown in FIGS. 26A-F. As can be seen, the ROGUE FBG yields far more accurate results than the unexposed SMF-28. Furthermore, the ROGUE FBG remains very similar to the calculated values for very short scanning bandwidths, and it is not until the smallest scanning bandwidth of 1 nm is used that significant errors can be observed. Measurements were taken while the fiber was static, in between stage movements, so that the strain remains constant during the frequency scan.

Figure 27:
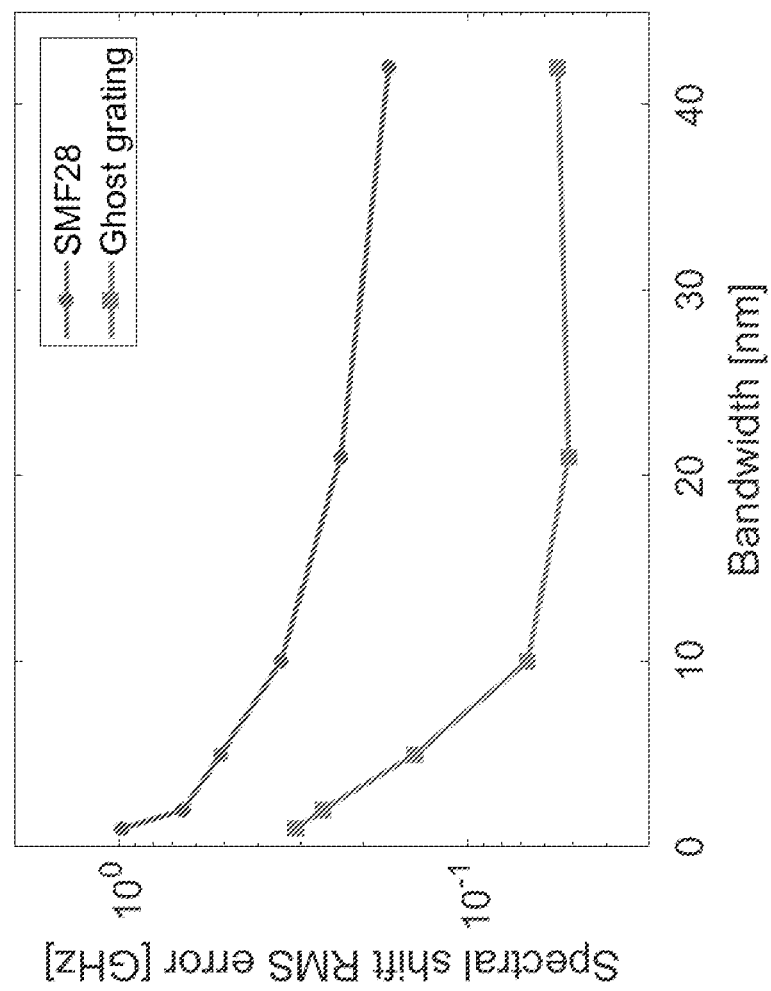
FIG. 27 is a graph showing spectral shift RMS error as function of bandwidth for both the unexposed fiber and a 10 cm FBG inscribed using the system of FIG. 21, calculated over the 20 µm stretching and across an 8 cm sensing region.

From these measurements, the root mean square errors between calculated and experimental values of the spectral shift were calculated over the 20 μm stretching. In the algorithm, an 8 cm sensing region was established on both, the ROGUE FBG and the unexposed SMF-28 fiber, with sensors at every 1 mm (80 sensors total). The RMS error was calculated across all those sensors, over the 20 μm stretching. As FIG. 27 shows, the behavior for the ROGUE FBG is very similar to the unexposed fiber, but the error is significantly lower, almost by an order of magnitude for every scanning bandwidth. In the case of the SMF-28, the error is minimal for the largest bandwidth, which is to be expected, but in the case of the ROGUE FBG, we see that the minimal error is actually for a 21.16 nm bandwidth. The explanation for this is the same as for the noise level, which is that since most of the signal is from a narrower bandwidth, a larger bandwidth does not necessarily yield a more accurate measurement. At this bandwidth, the RMS error is 4.5 smaller than with standard SMF-28. It can be observed that, using a ROGUE FBG, a scanning bandwidth of only 5.24 nm is sufficient to beat the best accuracy obtained with the SMF-28.

Figure 28:
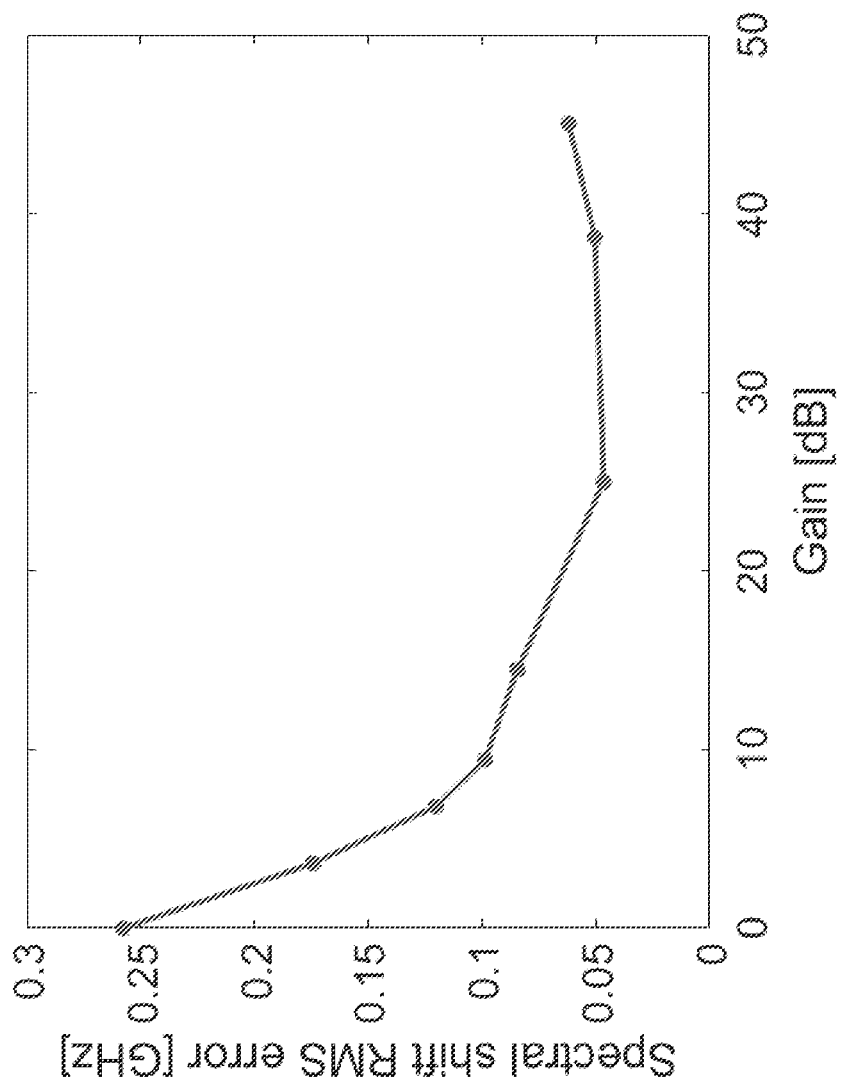
FIG. 28 is a graph showing spectral shift RMS error as function of gain for a FBG inscribed using the system of FIG. 21, calculated over a 20 µm stretching and across an 8 cm sensing region.

Finally, we evaluated how the strength of the ROGUE FBG influenced the accuracy of the measurement. In order to do this, ROGUE FBGs of various strengths were written, and the same measurements were performed over 20 μm stretching. Only the 21.16 nm bandwidth (the one that showed the smallest error) was used for the scan. FIG. 28 shows how the error is influenced by the ROGUE FBG gain. Unsurprisingly, for stronger gratings the mean error decreases. The small increase in the error as the gain of the ROGUE FBG increases is currently under investigation. However, it is noted that by decreasing the writing speed of the ROGUE FBG, it becomes stronger, to the cost of a slightly smaller bandwidth.

Figure 29:
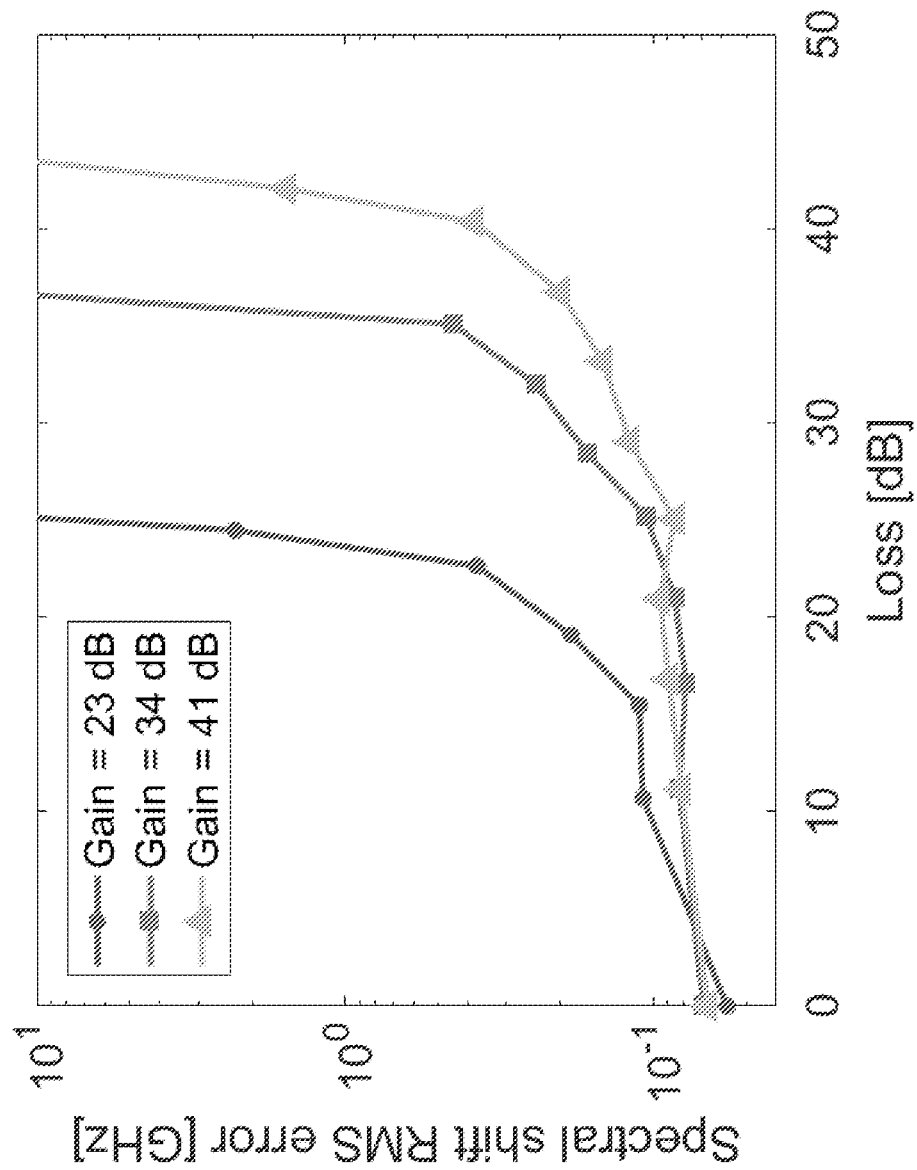
FIG. 29 is a graph showing spectral shift RMS error as function of loss for three FBGs of different strengths inscribed using the system of FIG. 21, calculated over a 20 µm stretching and across 8 cm of fiber.

In order to characterize the ROGUE FBGs ability to compensate for loss in the system, we repeated the same experiment with the three strongest ROGUE FBGs while inducing optical loss before the grating, to see how that affected the spectral shift accuracy. FIG. 29 presents these results as a function of loss in measurement signal, in which the optical loss was induced by a variable optical attenuator placed before the ROGUE FBG. As increasing loss is induced before the grating, the error increases slowly until a threshold is reached and a catastrophic increase in error occurs. This occurs when the loss gets close to the ROGUE FBG enhancement value. As such, the SNR is decreased below the requirement for proper cross-correlation. When the noise level has the same amplitude as the maximum of the ROGUE FBG reflectivity, all the information is lost in noise, and the algorithm can no longer recover the spectral shift.

Using the ROGUE FBG fabrication technique described earlier, we were able to increase the backscattered signal by orders of magnitude, i.e. to over 50 dB above standard SMF-28 levels. This increase in signal turns into an improvement of over an order of magnitude in RMS noise level, and an RMS error on accuracy in strain measurements 4.5 times smaller than standard SMF-28 fiber. As such, the most accurate and precise ROGUE FBGs we were able to fabricate, exhibited an RMS noise level of 0.016 GHz (0.1 µε or 13 mK) and 0.05 GHz spectral shift RMS error (0.34 µε or 40 mK) for a stretching range from 0 to 20 µm of the 1.15 m fiber length (0 to 17.4 µε). It is important to note that, for these last measurements, the fibers were placed inside a closed space that did not provide an environment as controlled as the insulated box that was used in the other set of experiments. As such, temperature fluctuations of this magnitude can be expected, and even more accurate readings could thus be expected when placing the fibers in a better controlled environment. Even though we showed that increasing the backscatter by more than 25 dB does not seem to improve measurement accuracy, for cases where significant loss occurs in the system, it is still worthwhile to increase the backscatter above 50 dB, in order to compensate for that loss. In case of loss, there is little wiggle room available with untreated standard SMF-28.

Since the scatter enhancement technique relies on noise during the writing process, the optical alignment is not critical, and the experimental conditions and the equipment do not require extensive control. Relatively fast writing speeds of 1 or even 10 mm/s yield sufficient increase in backscatter to noticeably enhance the accuracy of such sensors without requiring an enormous amount of laser power. The experimental setup used in this example relies on a Talbot interferometer configuration but could as easily be used by direct inscription of the grating with the fiber directly behind the phase mask. As such, this technique could thus be implemented in an industrial assembly line, or even during the drawing process of the fiber. Arguably environmental fluctuations or equipment vibrations during the ROGUE FBG writing could potentially even increase the strength of the ROGUE FBG by adding other sources of noise.

It is being noted that this enhancement is limited to the bandwidth of the ROGUE FBG. The laser power and writing speed are not sufficient to generate uniform Rayleigh enhancement, and as such scanning outside the ROGUE FBG does very little to enhance backscatter. However, scanning bandwidths of 21 nm and under are typically more than enough for most applications, and smaller bandwidths are usually favored for real-time applications, because they allow faster acquisition speeds.

Example 4—Order of Magnitude Increase in Resolution of Optical Frequency Domain Reflectometry Based Temperature and Strain Sensing by the Inscription of a ROGUE FBG OFDR has been investigated for two decades as a way to replace the FBG currently used in most industries for sensing applications, using the intrinsic Rayleigh scatter of fibers instead. OFDR allows completely distributed strain and temperature measurements along a fiber. The increase of backscatter using UV laser exposition was recently reported, and was found to increase the sensitivity in both temperature and strain sensing. We present a technique that increases the backscattered signal amplitude by over 50 dB, based on the writing of a ROGUE FBG, i.e. a very weak, random grating over the entire length of the fiber. This improvement is, to the inventors' knowledge, over 25 dB higher than what was previously reported for UV exposure for the same exposition power. The ROGUE FBG is generated by inducing phase noise during the continuous writing of a FBG using a Talbot interferometer. This leads to a grating with a very broad bandwidth regardless of the exposure length and greatly increases the signal without limiting the scanning bandwidth, resulting in no loss in resolution. Using these enhanced fibers, we obtained a noise level over an order of magnitude lower than using regular unexposed fibers, allowing measurements of smaller temperature variations. Fibers where such ROGUE FBGs are inscribed also allow the use of a much smaller scanning bandwidth with similar accuracy, resulting in faster acquisition speed.

In this example, we present a technique increasing the backscattered signal for Rayleigh scatter based distributed sensing by several orders of magnitude. This is achieved by writing a ROGUE FBG (a weak, random FBG) over the entire length of the fiber, resulting in higher reflectivity over a wide range of wavelengths. This in turn leads to better resolution in strain and temperature measurements when compared with standard single-mode fiber with uniform UV exposure, and to the possibility of faster scan speeds by using a narrower scanning bandwidth with similar accuracy.

Figure 30B:
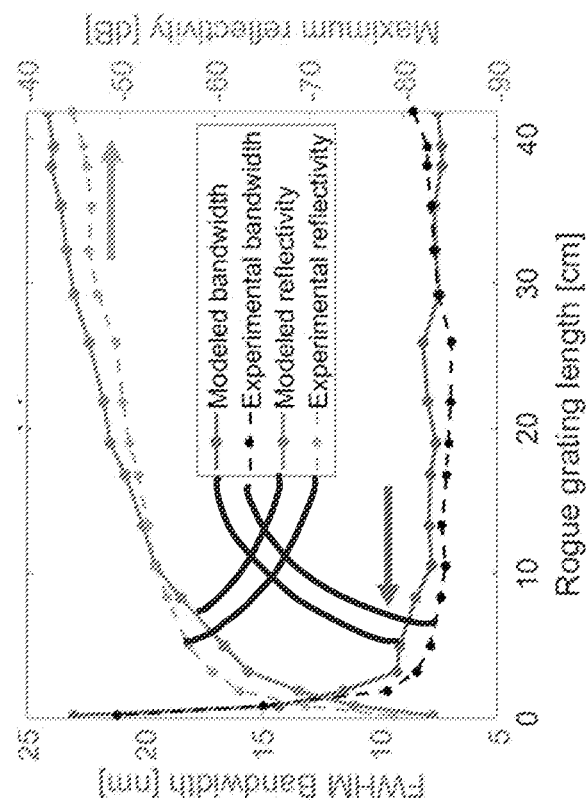
FIG. 30B is a graph showing full width at half maximum bandwidth of a FBG as function of length, including modeled and experimental data for FBGs having lengths ranging between 2 mm to 40 cm, shown on a linear scale.
Figure 30A:
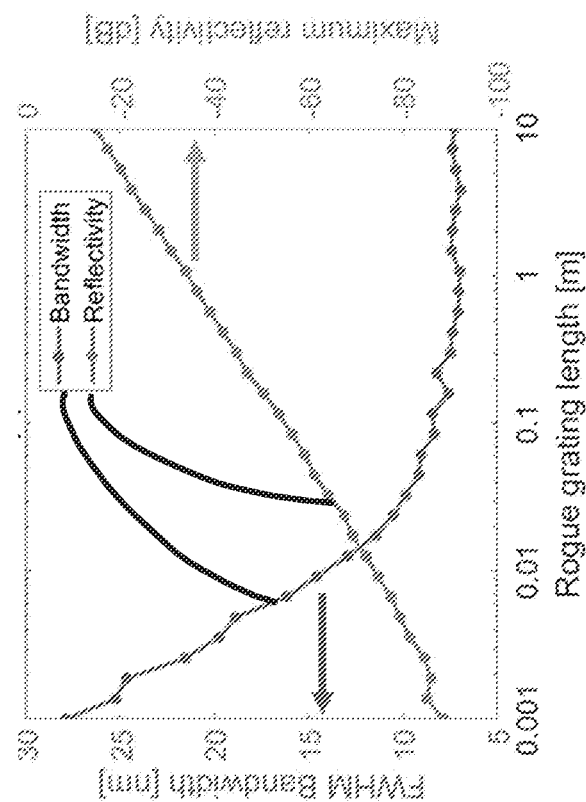
FIG. 30A is a graph showing full width at half maximum bandwidth of a FBG as function of length, as modeled for FBGs having lengths ranging between 1 mm and 10 m, shown on a logarithmic scale.

Example 5—Influence of the Length of a ROGUE FBG on its FWHM Bandwidth and on its RMS Noise Level In this example, the reflectivity and bandwidth of multiple lengths of ROGUE FBGs are measured. The results are presented in FIGS. 30A and 30B. As can be seen, the bandwidth of the grating is initially very large, but quickly converges to a certain value (here, about 7 nm) as the grating's length is increased. A probabilistic model was developed to evaluate the ROGUE FBGs behaviour for longer gratings. As can be seen, the ROGUE FBG bandwidth remains constant as the grating's length increases, while the reflectivity keeps increasing. As can be appreciated, a satisfactory agreement between the modeled and experimental data can be observed in FIG. 30B.

Figure 31:
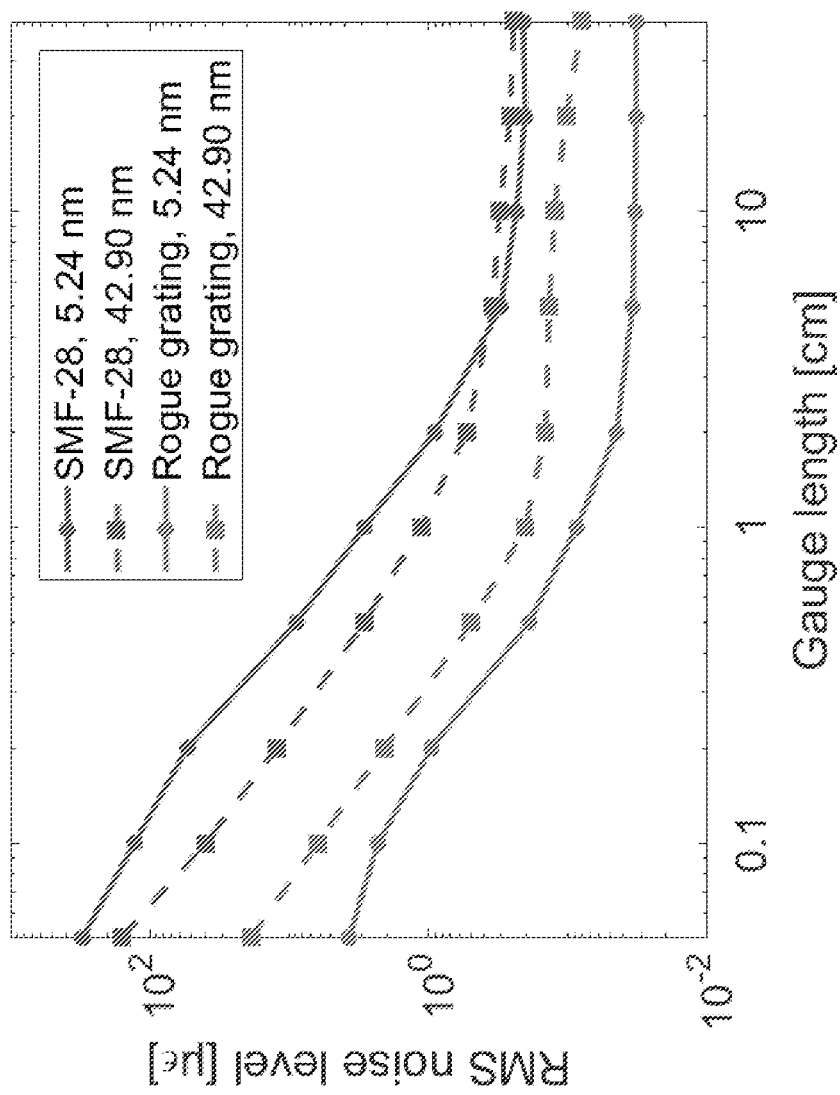
FIG. 31 is a graph showing RMS noise level as a function of gauge length ranging between 0.5 mm and 20 cm, for both unexposed fiber and ROGUE FBG, when placed in an insulated box, averaged over 15 measurements, for FWHM bandwidths of 5.24 and 42.90 nm.

The influence of the gauge length on the noise level is also evaluated and presented in FIG. 31. It was found that a smaller gauge length leads to a higher spatial resolution, but at the cost of the strain resolution. From FIG. 31, it can noted that, for very short gauge lengths, the spectral and spatial resolution seems to be Fourier-transform limited, and an increase in gauge length (spatial resolution) leads to a decrease in RMS noise level (spectral resolution). However, for very large gauge lengths, a plateau is met, and the added value of a larger gauge length is minimal. Furthermore, it is obvious that, regardless of the gauge length, the noise level is always much smaller with the ROGUE FBG than with the unexposed SMF-28 fiber. Finally, in this example, a ROGUE FBG scanned with a 5.24 nm bandwidth required a gauge length of only 2 mm to beat the noise level of SMF-28 with a 42.90 nm bandwidth and a 1 cm gauge length.

As can be understood, the examples described above and illustrated are intended to be exemplary only. Although the optical fibers are shown with a circular cross-section, the optical fibers of other possible embodiments of the optical fiber device can have any other suitable shape including, but not limited to, rectangular, hexagonal, and the like. For instance, the DTSS system described herein can be adapted to perform optical time domain reflectometry (OTDR) in which a pulse is sent and its return is monitored over time, and/or optical frequency domain reflectometry (OFDR) in which each measurement includes a scan in frequency or wavelength. The scope is indicated by the appended claims.

What is claimed is:

1. An optical device comprising:
a length of optical fiber configured for propagating an optical signal; and
an optical grating inscribed along a portion of the length of optical fiber, the optical grating having a random continuous distribution such that a return signal caused by said propagating has a full width at half maximum bandwidth ranging between about 0.1 THz and about 40 THz.

2. The optical device of claim 1 wherein said full width at half maximum bandwidth ranges between about 0.35 THz and about 7 THz.

3. The optical device of claim 1 wherein the grating has a coherence length ranging between about 2 λ and about 500 λ when the return signal has a scattering spectrum with a Gaussian shape, wherein λ denotes a wavelength of the optical signal.

4. The optical device of claim 1 wherein the random continuous distribution is a random phase distribution.

5. The optical device of claim 1 wherein the random continuous distribution is a random period distribution.

6. The optical device of claim 1 wherein the random continuous distribution is a random amplitude distribution.

7. The optical device of claim 1 wherein the random continuous distribution is one or more from the group consisting of: a random phase distribution, a random period distribution and a random amplitude distribution.

8. The optical device of claim 1 wherein the optical grating has a length being at least in the centimeter range.

* * * * *